(12) United States Patent
Cristache

(10) Patent No.: US 10,564,278 B2
(45) Date of Patent: *Feb. 18, 2020

(54) SYSTEMS AND METHODS FOR OBJECT LOCALIZATION AND PATH IDENTIFICATION BASED ON RFID SENSING

(71) Applicant: Lucomm Technologies, Inc., Bellevue, WA (US)

(72) Inventor: Lucian Cristache, Redmond, WA (US)

(73) Assignee: LUCOMM TECHNOLOGIES, INC., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/340,866

(22) Filed: Nov. 1, 2016

(65) Prior Publication Data
US 2017/0052252 A1 Feb. 23, 2017

Related U.S. Application Data

(63) Continuation of application No. 14/480,069, filed on Sep. 8, 2014, now Pat. No. 9,513,370, which is a continuation-in-part of application No. 13/921,933, filed on Jun. 19, 2013, which is a continuation-in-part of application No. 13/010,027, filed on Jan. 20, 2011,
(Continued)

(51) Int. Cl.
*G01S 13/87* (2006.01)
*G01S 5/02* (2010.01)
*H04B 5/00* (2006.01)

(52) U.S. Cl.
CPC .......... *G01S 13/876* (2013.01); *G01S 5/0278* (2013.01); *G01S 5/0289* (2013.01); *H04B 5/0062* (2013.01)

(58) Field of Classification Search
CPC .... G01S 13/876; G01S 5/0278; G01S 5/0289; H04B 5/0062
See application file for complete search history.

(56) References Cited

U.S. PATENT DOCUMENTS 6,381,536 B1* 4/2002 Satoh ................... G08G 1/09
340/995.1
6,717,508 B2* 4/2004 Sashida ................ B60R 25/04
307/10.2
(Continued)

*Primary Examiner* — Omer S Khan
(74) *Attorney, Agent, or Firm* — Lowe Graham Jones PLLC

(57) ABSTRACT

A networked radio frequency identification system includes a plurality of radio frequency identification (RFID) tag readers, a computer in signal communication with the RFID tag readers over a network, and a software module for storage on and operable by the computer that localizes RFID tags based on information received from the RFID tag readers using a network model having endpoints and oriented links. In an additional example, at least one of the RFID tag readers includes an adjustable configuration setting selected from RF signal strength, antenna gain, antenna polarization, and antenna orientation. In a further aspect, the system localizes RFID tags based on hierarchical threshold limit calculations. In an additional aspect, the system controls a locking device associated with an access point based on localization of an authorized RFID tag at the access point and reception of additional authorizing information from an input device.

16 Claims, 5 Drawing Sheets

Related U.S. Application Data now Pat. No. 8,514,081, which is a continuation of application No. 11/829,695, filed on Jul. 27, 2007, now Pat. No. 7,898,419.

(56) References Cited

U.S. PATENT DOCUMENTS

| | | | | |
|---|---|---|---|---|
| 2002/0144151 A1* | 10/2002 | Shell | ............... | H04L 63/102 |
| | | | | 726/7 |
| 2005/0116823 A1* | 6/2005 | Paulsen | ............... | G01S 5/06 |
| | | | | 340/539.13 |
| 2007/0008069 A1* | 1/2007 | Lastinger | ............ | G06K 7/0008 |
| | | | | 340/10.1 |
| 2008/0116264 A1* | 5/2008 | Hammad | ............ | G06Q 20/045 |
| | | | | 235/382 |
| 2009/0289776 A1* | 11/2009 | Moore | ............... | G06K 7/0008 |
| | | | | 340/10.41 |
| 2010/0210257 A1* | 8/2010 | Ogai | ............... | H04W 28/18 |
| | | | | 455/422.1 |
| 2010/0250305 A1* | 9/2010 | Lee | ............... | G06Q 10/06316 |
| | | | | 705/7.26 |

\* cited by examiner

SYSTEMS AND METHODS FOR OBJECT LOCALIZATION AND PATH IDENTIFICATION BASED ON RFID SENSING

PRIORITY CLAIM

This application is a continuation of U.S. patent application Ser. No. 14/480,069 filed Sep. 8, 2014, which is a continuation-in-part of U.S. patent application Ser. No. 13/921,933 filed Jun. 19, 2013, which is a continuation-in-part of U.S. patent application Ser. No. 13/010,027 filed Jan. 20, 2011, which is a continuation of U.S. patent application Ser. No. 11/829,695 filed Jul. 27, 2007; contents of which are incorporated by reference.

FIELD OF THE INVENTION

This invention relates generally to object localization and path identification and, more specifically, to object localization and path identification based on radio frequency identification (RFID) sensing.

BACKGROUND OF THE INVENTION

Systems and methods for localizing objects using RFID sensing tend to be limited to simple location determination and do not typically allow for dynamic sensing reconfiguration based on varying application demands.

SUMMARY OF THE INVENTION

In one example, the present invention comprises a networked radio frequency identification system that includes a plurality of radio frequency identification (RFID) tag readers, a computer in signal communication with the RFID tag readers over a network, and a software module for storage on and operable by the computer that localizes RFID tags based on information received from the RFID tag readers using a network model having endpoints and oriented links.

In accordance with an additional example of the invention, the software module is configured to determine a semantic attribute of RFID tag movement.

In accordance with an additional example of the invention, the software module is configured to restrict or allow access to an access point to authorized RFID tags (access control). In one example, the software module accepts time intervals from a user along with access restriction/authorization rules associated with the time intervals as well as identification information related to the RFID tags or groups of RFID tags to be restricted/authorized. The software module restricts/authorizes access based on the time intervals, their associated access restriction/authorization rules, and the RFID tag information. Access points include, for example, access doors, barriers, and access gates. In addition, tracking points within an area may also be monitored.

In accordance with further examples of the invention, at least one of the RFID tag readers includes an adjustable configuration setting selected from RF signal strength, antenna gain, antenna polarization, and antenna orientation. In one example, the software module adjusts the adjustable configuration setting based on input from a user. However, the software module may also adjust the configuration setting based on other configuration settings or based on computed values during runtime. In an additional example, the software module is configured to accept time intervals from a user along with security levels that are associated with the time intervals and the software module adjusts the configuration setting based on the time intervals and their associated security levels.

In accordance with other examples of the invention, the system localizes RFID tags based on information received from the RFID tag readers using hierarchical threshold limit calculations. In one example, the hierarchical threshold limit calculations are based on accumulated reading factors from groups of settings for the RFID tag readers. In an additional example, the software module is configured to collect data for each setting of the RFID tag readers during an interval of time and calculate an aggregate result for each RFID tag reader based on an algorithm that uses a weighting function that includes $W_{k,l}$ and $NR_{k,l}$ as parameters where $NR_{k,l}$ represents the number of RFID tag readings at an interrogator 'k' configured with a setting 'l' and $W_{k,l}$ represents a weighting factor assigned to the interrogator 'k' configured with the setting 'l', and the algorithm spans all settings 'l' for the interrogator 'k'. The software module in this additional example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with further examples of the invention, the hierarchical threshold limit calculations are based on accumulated reading factors from settings of groups of RFID tag readers. In one example, the software module is configured to collect data for each group setting of a group of RFID tag readers during an interval of time and calculate an aggregate result for each group setting based on an algorithm that uses a weighting function that includes $W_{k,l}$ and $NR_{k,l}$ as parameters where $NR_{k,l}$ represents the number of RFID tag readings at an interrogator 'k' configured with a group setting 'l' and $W_{k,l}$ represents a weighting factor assigned to the interrogator 'k' configured with the group setting 'l', and the algorithm spans all group settings 'l' for the interrogator 'k'. The software module in this example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with yet other examples of the invention, the system localizes RFID tags based on information received from the RFID tag readers using probabilistic threshold calculations. In one example, the probabilistic threshold calculations are based on accumulated probabilities from groups of settings for RFID tag readers. In an additional example, the software module is configured to collect data for each setting of the RFID tag readers during an interval of time and calculate an aggregate result for each RFID tag reader based on an algorithm that uses a weighting function that includes $W_{k,l}$ and $P_{k,l}$ as parameters where $P_{k,l}=PF_{k,l}(NR_{k,l}, C_{k,l})$ is the probability that the RFID tag is at endpoint $E_i$ as detected from interrogator 'k' with settings 'l' calculated with the function $PF_{k,l}$ with $NR_{k,l}$ representing the number of RFID tag readings at interrogator 'k' configured with settings 'l' and $C_{k,l}$ representing a reference reading value for interrogator 'k' configured with settings 'l' and where $W_{k,l}$ represents a weighting factor assigned to the interrogator 'k' configured with the settings 'l', and the algorithm spans all settings 'l' for the interrogator 'k'. The software module in this additional example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with additional examples of the invention, the probabilistic threshold calculations are based on accumulated probabilities from settings of groups of RFID tag readers. In one example, the software module is configured to collect data for each group setting of a group of RFID tag readers during an interval of time and calculate an aggregate result for each group setting based on an algorithm that uses a weighting function that includes $W_{k,l}$ and $P_{k,l}$ as parameters where $P_{k,l} = PF_{k,l}(NR_{k,l}, C_{k,l})$ is the probability that the RFID tag is at endpoint $E_i$ as detected from interrogator 'k' with group settings 'l' calculated with the function $PF_{k,l}$ with $NR_{k,l}$ representing the number of RFID tag readings at interrogator 'k' configured with group settings 'l' and $C_{k,l}$ representing a reference reading value for interrogator 'k' configured with group settings 'l' and where $W_{k,l}$ represents a weighting factor assigned to the interrogator 'k' configured with the group settings 'l', and the algorithm spans all group settings 'l' for the interrogator 'k'. The software module in this example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with still further examples of the invention, the system includes a plurality of radio frequency identification (RFID) tag readers, a computer in signal communication with the plurality of RFID tag readers over a network, a locking device associated with an access point, the locking device in signal communication with the computer, an input device in signal communication with the computer, and a software module for storage on and operable by the computer. In some embodiments, multiple access points may be included and multiple locking devices and/or input devices may be associated with each access point. In one example, the software module localizes an authorized RFID tag at the access point based on information received from at least one of the plurality of RFID tag readers, receives additional authorizing information from the input device, and sends an unlock signal to the locking device based on the localization of the authorized RFID tag at the access point and the additional authorizing information.

In accordance with yet other examples of the invention, the input device includes a keypad and the additional authorizing information includes an access code. In some embodiments, the input device may include a keypad terminal, a computer, a touch screen, or other components.

In accordance with still another example of the invention, the input device includes a mobile communications device, the software module is configured to send a request for an access code to the mobile communications device after the authorized RFID tag is localized at the access point, and the additional authorizing information includes the requested access code transmitted from the mobile communications device. In another example, the additional authorizing information may be received by the software module before the RFID tag is localized. The authorization message received from the mobile device may be valid for a predefined period of time, for example during which the RFID tag would need to be localized at the access point for an unlock signal to be sent to a locking device associated with the access point. In still another example, rather than an access code being received from the mobile device, an empty message might be received from a phone number associated with the mobile device, with the authorizing information being the phone number of the message itself.

In accordance with still another example of the invention, the input device includes a location enabled mobile communications device with global positioning system (GPS) capability, the software module is configured to receive or retrieve the location information from the mobile communications device after the authorized RFID tag is localized at the access point, and the additional authorizing information is computed based on the location information received from the mobile communications device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
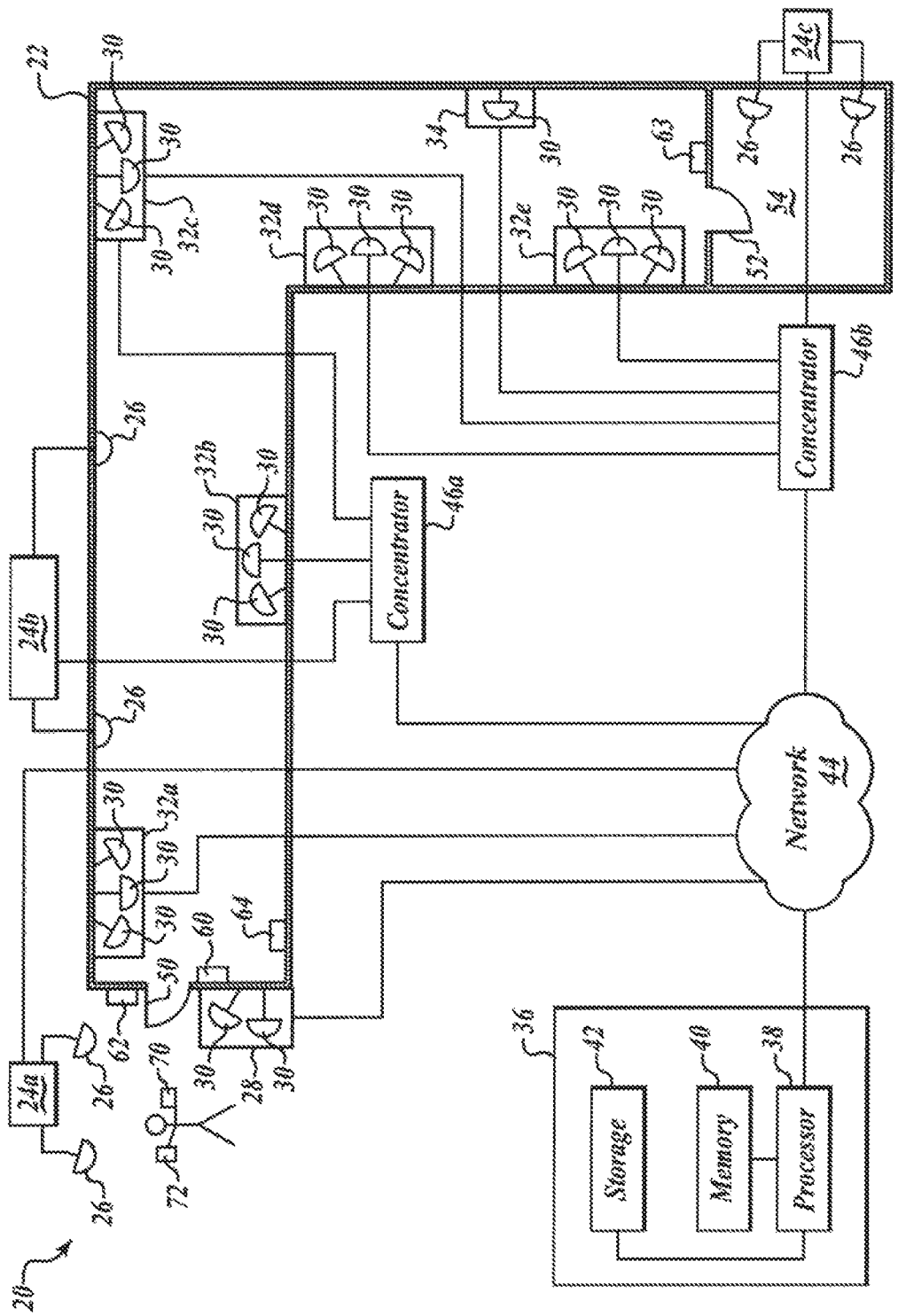
FIG. 1 is a diagram illustrating an environmental view of a system formed in accordance with an embodiment of the invention that is installed in a structure.

FIG. 1 is a block diagram showing an environmental view of a system 20 formed in accordance with an embodiment of the invention that is installed in a structure 22. Although a transceiver is preferred, a separate transmitter and receiver may alternatively serve as a transceiver within the scope of this invention.

The system 20 includes a plurality of radio frequency (RF) readers, each of which is associated with at least one interrogator. Each interrogator includes a transceiver and an antenna. Each interrogator (including transceiver and antenna) or only the interrogator's antenna may be external to the associated RF reader or embedded within the RF reader. The system 20 as shown includes three RF readers 24a, 24b, and 24c, each of which include two interrogators 26 that have antennas external to the RF readers 24a, 24b, and 24c. Transceiver components (not shown) of the interrogators 26 are embedded within the RF readers 24a, 24b, and 24c and are in signal communication with their associated antennas. Although the interrogators 26 are numbered the same, they might have differing technical characteristics in some embodiments. The system 20 also includes an RF reader 28 that has two embedded interrogators 30, five RF readers 32a, 32b, 32c, 32d, and 32e that each has three embedded interrogators 30, and an RF reader 34 that has one embedded interrogator 30.

The system 20 also includes a computer 36 that has a processor 38 in data communication with a memory unit 40 and a storage device 42 also in data communication with the processor 38. In an example embodiment, the computer 36 is an application and database server. Additional computers or computer banks are also present in some embodiments. The computer 36 is in signal communication with a network 44. The network 44 is a wired network in an example embodiment, but is a wireless network in other embodiments. The RF readers 24a, 28, and 32a are also in signal communication with the network 44. The RF readers 24b, 32b, and 32c are in signal communication with a concentrator 46a. A concentrator is a computer that handles a set of RF readers and that may control parameters or settings of interrogators associated with any RF readers the concentrator handles. A concentrator may also issue commands to access doors and/or locking devices and receive feedback from them. The concentrator 46a is also in signal communication with the network 44. The RF readers 24c, 32c, 32d, 32e, and 34 are in signal communication with a concentrator 46b that is also in signal communication with the network 44.

In the example shown in FIG. 1, the RF readers 24a and 28 are positioned outside an entrance to the structure 22. A door 50 located at the entrance leads to a first end of a first hallway within the structure 22. The RF readers 32a and 32b are positioned along the first hallway within the structure 22. The RF reader 24b is shown outside the structure 22, but the antennas of the interrogators 26 associated with the RF reader 24b are positioned along the first hallway within the structure 22. The RF reader 32c is positioned toward a second end of the first hallway, but is also positioned at a first end of a second hallway within the structure 22 that is oriented at a right angle to the first hallway. The RF readers 32d, 32e, and 34 are positioned along the second hallway within the structure 22. A door 52 is located at a second end of the second hallway. The door 52 controls access to a room 54 located within the structure 22. The antennas of the interrogators 26 associated with the RF reader 24c are positioned within the room 54. Although a specific configuration of RF readers, concentrators, and interrogators is shown, it should be understood that alternative configurations are used in other embodiments. Some embodiments do not use concentrators, for example. Other embodiments have the readers and/or the concentrators connected point to point in a mesh topology.

The system 20 also includes a locking device 60 that is associated with the door 50. The locking device 60 is in signal communication with the computer 36 over the network 44 (connection not shown) and is selectively locked and unlocked based on information received at the computer 36 from RF readers positioned near the door 50. Although the locking device 60 is controlled by the computer 36 in this embodiment, in other embodiments the locking device 60 is in signal communication with one or more RF readers or one or more concentrators that control the locking device 60 in a decentralized fashion. A locking device 63, similar to the locking device 60, is associated with the door 52 so that the system 20 is able to selectively control access to the room 54. A first input device 62, such as a keypad or touch screen for example, is positioned outside the structure 22 near the door 50. The first input device 62 is in signal communication with the computer 36 over the network 44 (connection not shown). In some embodiments, the input device 62 is connected to a concentrator or to a computer (not shown) other than the computer 36. A second input device 64, such as a keypad or touch screen for example, is positioned inside the structure 22 near the door 50. The second input device 64 is in signal communication with the computer 36 over the network 44 (connection not shown). In some embodiments, the input device 64 is connected to a concentrator or to a computer (not shown) other than the computer 36.

The system 20 is configured to work with one or more RFID tags 70 that typically include unique identifiers and may include other information. In an example embodiment, an RFID tag 70 is carried by a person that travels into, out of, and within the structure 22. However, in other embodiments, RFID tags are also associated with non-human objects. The RFID tags may also be embedded in cards, clothing, devices, vehicles, or other objects in some embodiments. In one embodiment, the RFID tag 70 is a passive RFID device. However, other embodiments may be configured to locate non-passive RFID devices. The system 20 is also configured to interact with a mobile communications device 72 in some embodiments. In one example, a software module localizes an authorized RFID tag at an access point such as the door 50 based on information received from at least one of the plurality of RFID tag readers, receives additional authorizing information from an input device, and sends an unlock signal to a locking device such as the locking device 60 based on the localization of the authorized RFID tag at the access point and the additional authorizing information. Since RFID tags recognized by the system typically include unique identifiers, different levels of access can be assigned to users or groups of users that have been assigned particular RFID tags. In one example, the additional authorizing information includes an access code received at an input device such as the first input device 62. In an additional example, the additional authorizing information includes an access code first transmitted to a mobile communications device such as the device 72 by the system 20 which is then entered at the first input device 62. In an additional example, an access code is entered into the device 72 and transmitted to the system 20.

One exemplary manner of operation is as follows. Once the RFID tag 70 is detected near the door 50, an appropriate signal is sent to the computer 36. In some embodiments, the tag 70 might also have associated access control rules at the door 50. Separately, the user associated with the tag 70 may send a signal via email or cell phone (for example) that is received at the computer 36 over a network such as an external phone or data network (not shown). The computer 36 searches one or more stored databases of RFID data and compares the stored data with the received secondary signals. For example, the RFID tag 70 may be paired with a cell call from a specific phone number, or receipt of an email from a particular email address with "unlock" or other known subject headers. If both the RFID tag 70 is sensed and the secondary access code or message is received, the door 50 is caused to be unlocked by the computer 36. If the RFID tag 70 is sensed but no code received, the computer 36 may automatically send an email, text message, or other signal to the user associated with the tag 70 to prompt the user to send the secondary access code.

A second exemplary manner of operation is as follows. Once the RFID tag 70 is detected near the door 50, an appropriate signal is sent to the computer 36. Separately, the user associated with the tag 70 may have a location enabled device that provides global location information such as GPS coordinates that is received at the computer 36 over a network such as an external phone or data network (not shown). The computer 36 compares the location information from the mobile device to the location of the detected RFID tag and if the locations are close to one another (within a predetermined range), the door 50 is unlocked by the computer 36. If the RFID tag 70 is sensed but no mobile device location is received or can be retrieved, or the locations don't match within the predetermined range, the computer 36 may automatically send an email, text message, or other alarm signal to the user associated with the tag 70 or to other personnel.

Typically, subjects that include employees, visitors, assets, cars, and other objects are assigned an RFID tag that is used to identify it to the system 20.

Figure 2A:
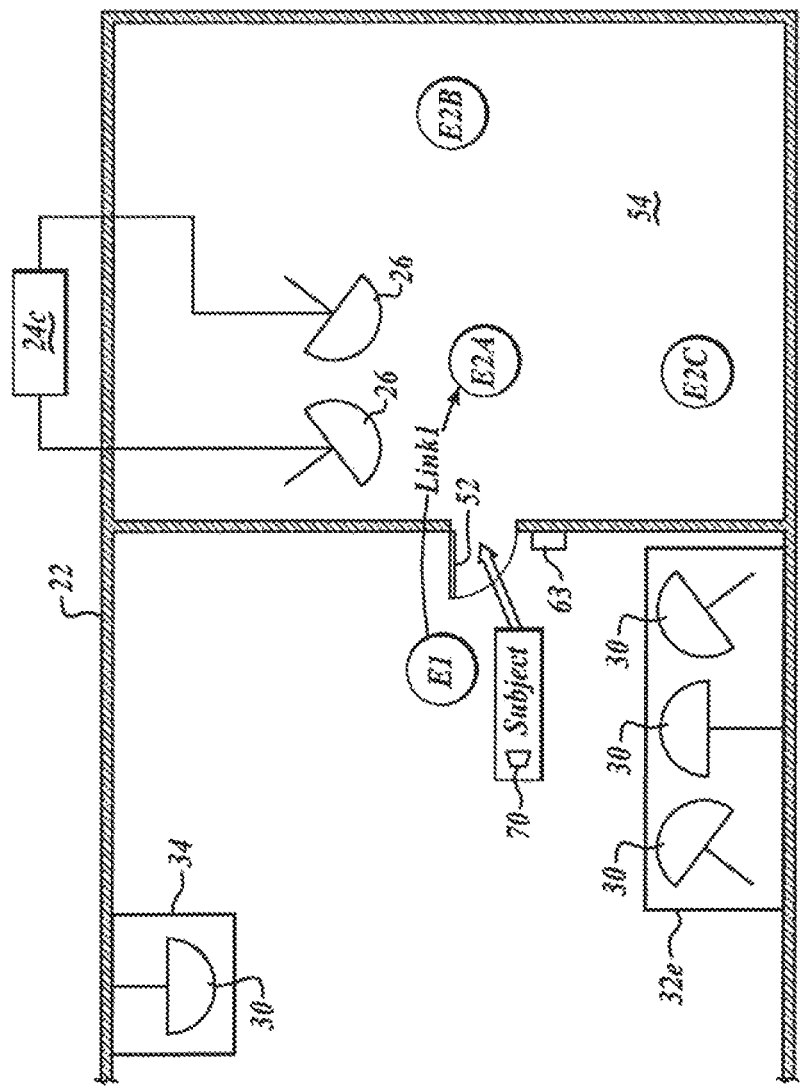
FIGS. 2A and 2B are diagrams showing additional detail for a portion of FIG. 1.
Figure 2B:
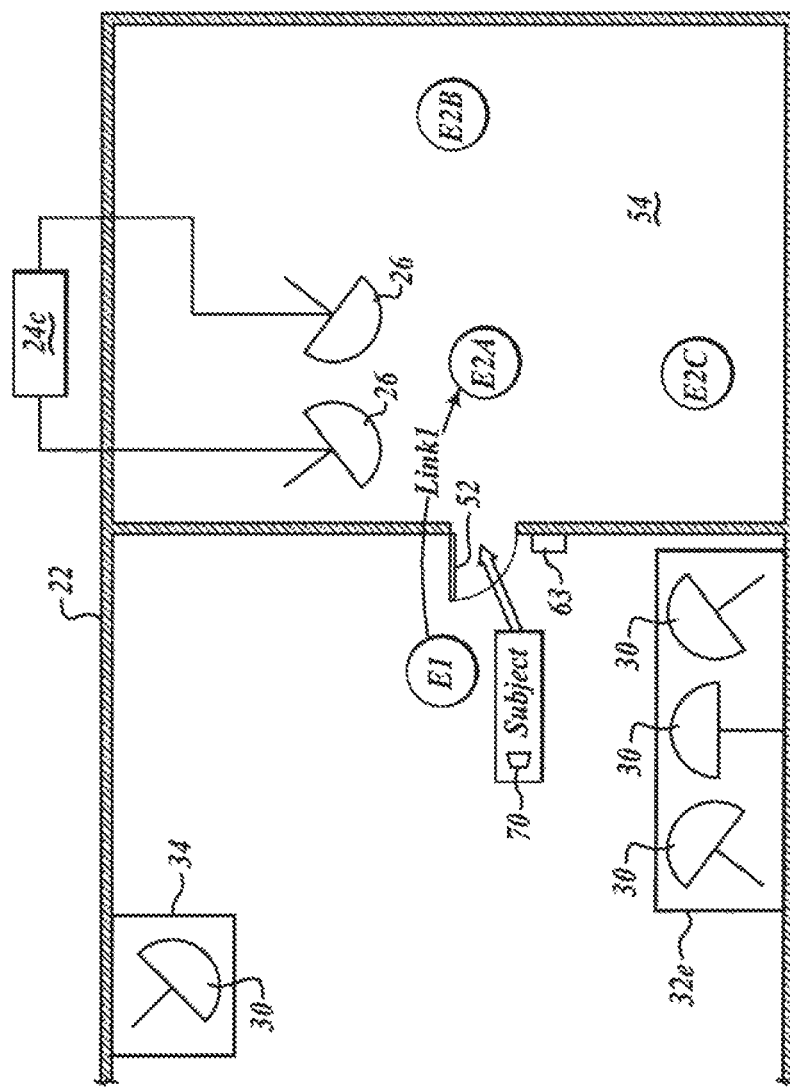

FIGS. 2A and 2B are diagrams showing additional detail for a portion of the system 20 and the structure 22 near the room 54 in an example embodiment. The RF readers 32e and 34 are shown, as well as the antennas of the interrogators 26 associated with the RF reader 24c. A subject with an RFID tag 70 is shown outside the room 54 near the door 52. As the tag 70 is detected by the RF readers 32e and 34, the system 20 indicates that the subject is at a first endpoint, designated as E1. In FIG. 2A, the antenna of interrogator 30 associated with the reader 34 is oriented at approximately a 90 degree angle from the wall to which the reader 34 is attached. FIG. 2B is substantially similar to FIG. 2A, except that the antenna of the interrogator 30 associated with the reader 34 is oriented at approximately a 45 degree angle from the wall to which the reader 34 is attached such that the antenna points in the general direction of E1. Movement of the tag 70 into the room 54 causes the RF reader 24c to detect the tag 70, at which time the system 20 indicates that the subject is at a second endpoint designated as E2A. The system also indicates that the tag just moved from E1 to E2A with an identifier designated as Link1. Additional movement of the tag 70 within the room 54 is also tracked by the RF reader 24c such that the subject and tag 70 may be identified as being associated with an additional endpoint E2B or E2C (links to other endpoints not shown) as they move about the room 54.

Sensing at each endpoint is done using one or more RF interrogators. Each interrogator includes a transceiver and an antenna. The interrogator antennas emit electromagnetic waves generated by the transceiver which, when received by an RFID tag or card, eventually activates the tag or card. Once the tag is activated, it reflects a wave with encoded data that is received by the interrogator. Each interrogator has a number of settings, each with an associated weight. The settings include transmitted RF output power (RF signal strength), antenna gain, antenna polarization and antenna orientation. RF settings may change very rapidly in order to allow a broad range of collection data. The weights associated with the RF settings are used by a localization engine to compute a value using eligibility calculations that determines the location of an object in space if it is within a threshold interval associated with a specific location. The localization engine computes collected data received from the interrogators and aggregates the results. The aggregate result is then used to determine the location and movement of subjects.

In the example shown in FIGS. 2A and 2B, the RF reader 24c localizes the tag 70 by transmitting and receiving RF signals using the interrogators 26. Each of the two antennas of the interrogators 26 associated with the RF reader 24c is positioned with a different position and orientation. The received RF signal strength from the tag 70 varies at each of the two interrogators 26 depending on the location of the tag 70 within the room 54 and the current RF settings of each interrogator 26. The number of reads in a predetermined time period at each interrogator 26 also varies depending on similar factors. The localization engine then localizes the tag 70 within the room 54, such at a location associated with E2A, E2B, or E2C based on the received RF signal strength and/or number of reads received at each interrogator 26 for particular RF settings.

FIGS. 3-6 are diagrams illustrating examples of network models in accordance with an embodiment of the invention. Each network model includes one or more endpoints. Each endpoint has an associated physical location or area in space and is represented in the network model as a graph node. Two endpoints and their sequence define an oriented link that is mapped to an oriented link in the graph. The network model may be hierarchical, on multiple levels, in the sense that at a higher level one graph node (endpoint) may represent a collection of nodes (endpoints) of a lower level with better resolution. An installed system is represented as a facility space network model that includes a series of endpoints (nodes) and their connected oriented links. As such, at each level, the facility space network model resembles a spatial graph.

Figure 3:
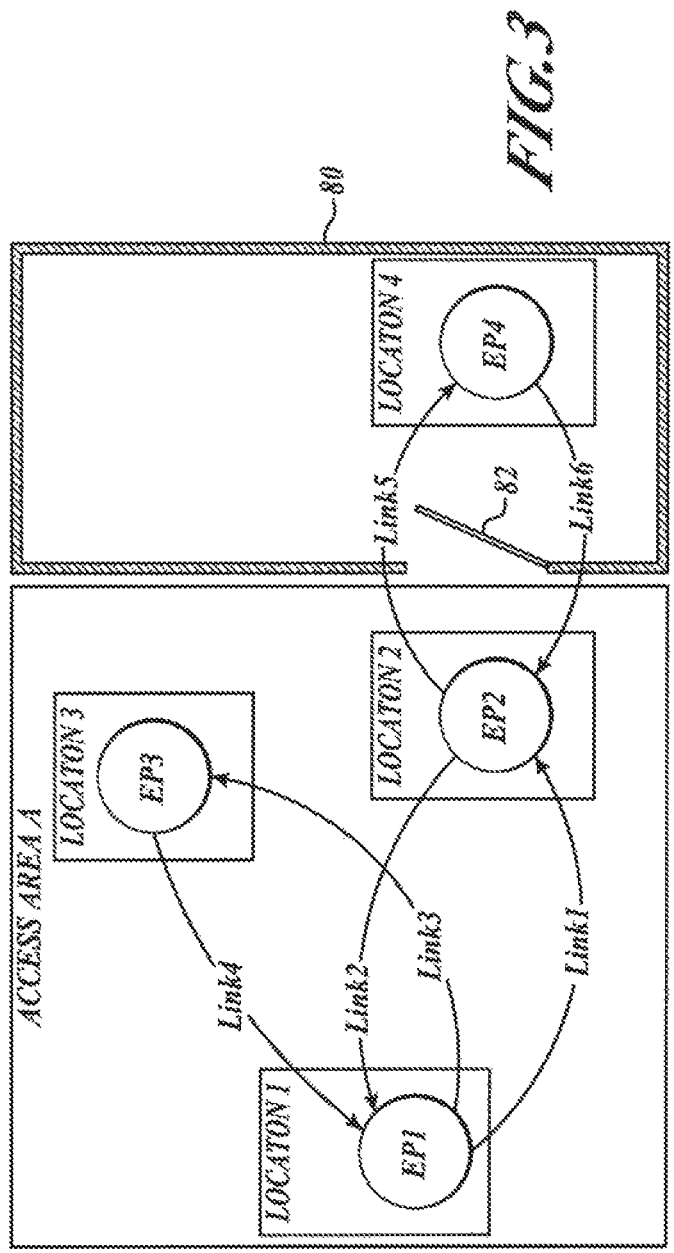
FIGS. 3-6 are diagrams showing examples of network models in accordance with an embodiment of the invention.

With respect to FIG. 3, the diagram includes first, second, third, and fourth endpoints designated as EP1, EP2, EP3, and EP4 respectively. Each of the four endpoints is associated with a corresponding physical location that is labeled as location 1 through location 4 respectively. Oriented links labeled Link1 through Link6 are shown that represent possible paths that an RFID tag could take between spatial locations associated with the endpoints. EP1, EP2, and EP3 are shown within a box labeled Access Area A. In one example, location 4 is inside a room 80 having an entrance with a door 82 (shown partially open) and Access Area A corresponds to an area outside of the room 80 near the door 82. In an example embodiment, a system, such as the system 20 described with respect to FIG. 1 is used to localize an RFID tag within and outside the room 80 at locations one through four and other locations, using RF readers (not shown) in a similar manner to that described with respect to FIGS. 1, 2A, and 2B.

Figure 4:
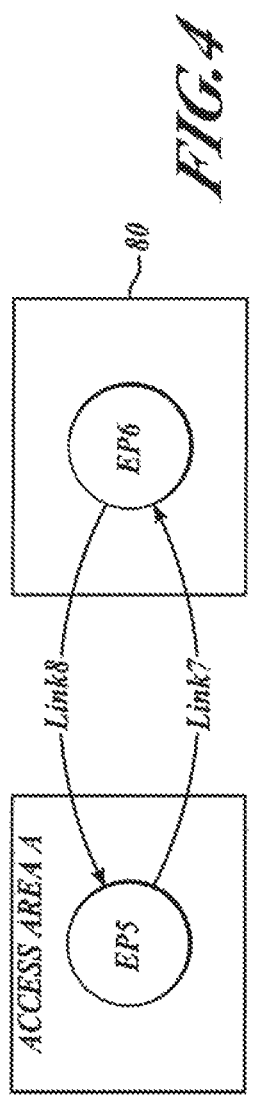

FIG. 4 is an example of a higher level network model used in conjunction with the model represented in FIG. 3 to form a hierarchical network model. FIG. 4 includes a fifth node and a sixth node designated as EP5 and EP6, respectively. EP5 represents all of the nodes EP1, EP2, and EP3, and EP6 represents EP4 and any location inside the room 80 shown in FIG. 3. Oriented links, labeled Link7 and Link8 are shown that represent possible paths that an RFID tag could take between spatial locations associated with EP5 and EP6.

Figure 5:
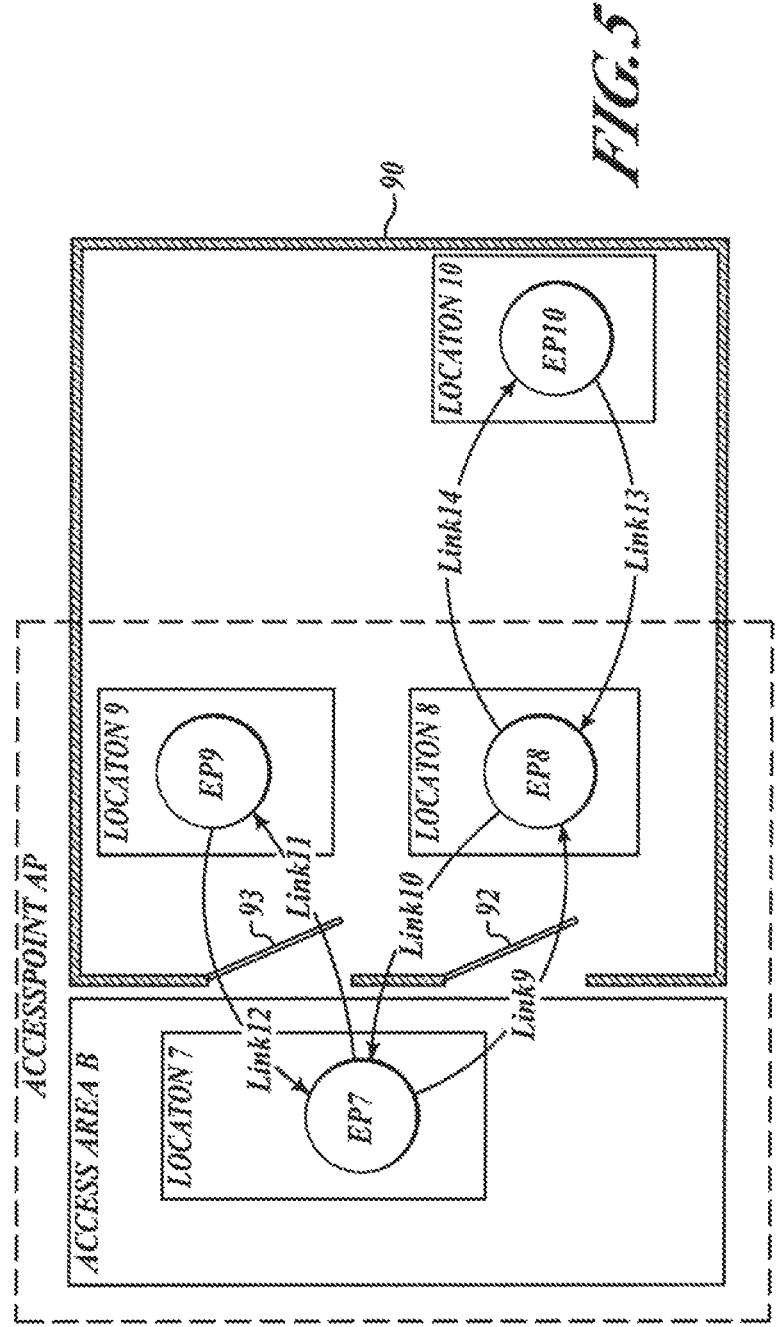

With respect to FIG. 5, the diagram includes first, second, third, and fourth endpoints designated as EP7, EP8, EP9, and EP10 respectively. Each of the four endpoints is associated with a corresponding physical location that is labeled as location 7 through location 10 respectively. Oriented links are shown that represent possible paths that an RFID tag could take between spatial locations associated with the endpoints. EP7 is shown within a box labeled Access Area B. In one example, locations 8, 9 and 10 are inside a room 90 having an entrance with doors 92 and 93 (shown partially open) and Access Area B corresponds to an area outside of the room 90 near the doors 92 and 93. In an example embodiment, a system, such as the system 20 described with respect to FIG. 1 is used to localize an RFID tag within and outside the room 90 at locations seven through ten and other locations, using RF readers (not shown) in a similar manner to that described with respect to FIGS. 1, 2A, and 2B.

Figure 6:
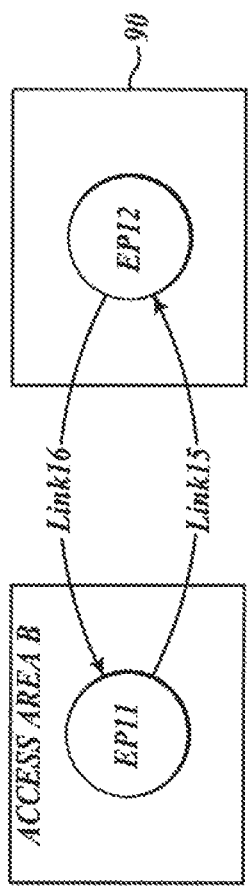

FIG. 6 is an example of a higher level network model used in conjunction with the model represented in FIG. 5 to form a hierarchical network model. FIG. 6 includes a node designated as EP11 and a node designated as EP12. EP11 represents EP7 and any location inside Access Area B shown in FIG. 5. EP12 represents all of the nodes EP8, EP9, and EP10, and any location inside the room 90. Oriented links, labeled Link15 and Link16 are shown that represent possible paths that an RFID tag could take between spatial locations associated with EP11 and EP12. A hierarchical model such as that represented by FIGS. 5 and 6 allows different semantics of movement to be associated with each level. For example, Link9 and Link 11 shown in FIG. 5 might represent semantic attributes of 'IN DOOR 92' and 'IN DOOR 93', respectively while Link15 shown in FIG. 6 might represent 'ENTER ROOM 80'. Although FIG. 6 is one example of a higher level network model corresponding to the model shown in FIG. 5, other models could be used in other embodiments. Additionally, more than two levels may be used in some hierarchical network models.

In an example embodiment, the network model is organized as a graph and a semantic engine computes semantic rules based on attributes of elements in the network model graph. In some embodiments, the network model has a hierarchical structure on multiple levels. Semantic rules are both statically defined and learned by the semantic engine while the system is running in an example embodiment. An example of a statically defined semantic rule is that if a subject with an RFID tag passes an oriented link in the model and that link has an 'IN' attribute associated with it, the semantic engine will interpret that movement as an entrance event into the space represented by the destination node, or, more generally, into a larger space in which the space represented by the destination node is located if the 'IN' attribute includes additional information such as an 'IN' attribute labeled 'INTO ROOM' or 'INTO BUILDING', for example. For example, movement from EP2 to EP4 might represent an entrance event into the room 80, with Link5 having an attribute labeled 'INTO ROOM' associated with it. In this example, the semantic engine would interpret movement of a subject with an RFID tag from EP2 to EP4 as an entrance event into the room 80. This semantic attribute is an indicator of movement from outside the room 80 to inside the room 80, rather than simply an indicator that the detected tag is in the room 80.

Movement into and out of spaces larger than those represented by destination nodes may be identified in other manners in some embodiments. For example, an entrance event into the room 80 may be identified based on Link5 having an attribute labeled 'IN' if location 4 is mapped to the room 80 and the semantic engine uses this mapping along with the 'IN' attribute of Link5 to identify the entrance event. In some embodiments, direction of movement can also be considered to be a semantic event, such as 'walk front to back in a particular area' or 'walk north', for example. In embodiments where a hierarchical network model is used, the semantic engine may use the semantics of any level or combination of levels to identify any semantic events. For example, the semantic of movement from EP2 to EP4 at the level shown in FIG. 3 is of movement from location 2 to location 4. However, at a higher level (as represented in FIG. 4) the movement from EP2 to EP4 maps as a movement from EP5 to EP6 and the semantic might be of entrance into the room 80. Further still, at an even higher level (not represented here) the semantic might be of entrance into a building where the room 80 is located. The semantic engine infers the semantics of an action using the hierarchical model.

Learned semantic rules are determined by the system at runtime using inputs and observations. An example of a learned semantic rule is when a subject with an RFID tag is preparing to leave a building through an access door, but is required by the system to enter the semantics passing through the door before being allowed to pass through the door and consequently a link in the network graph. The subject may specify that it is a break event by using a keypad, touch screen, or other input device such as the keypad 64 shown in FIG. 2 before passing through the door 50. The semantic engine then determines that passing that link in the network graph represents an exit event (OUT event). In one example, time values are also recorded by the system 20 for some or all localization determinations and semantic attribute determinations. These time values may be stored in association with an identifier associated with an RFID tag that had been localized or that had received a semantic attribute determination. The time values may be set to expire after a certain period of time, may only apply to particular semantic attributes or particular RFID tags, may be stored in a system database and/or log and/or be used to calculate (time) tracking data.

A software module (having an access control engine component) restricts or allows access at an access point based on access control rules associated with elements in the network model graph. Access control rules are based on configuration settings and/or they may be defined by a user and saved in the configuration settings. Access control rules are associated with oriented links in the network model. An example of a defined access control rule is that an RFID tag is allowed to pass an oriented link only if it is authorized to do so. In another example, an RFID tag may be authorized to pass an oriented link in the network model only in certain periods of time during a day if the user has defined time restriction intervals on the access path represented by the oriented link. The access control rules might be specific for each RFID tag or group of RFID tags or may be general. The access control rules might also be associated with additional authorization information such as entering an additional access code, mobile device authentication information, or global positioning location matching, for example. In one example, time values are also recorded by the system 20 for some or all access events (lock/unlock/door open) and access control determinations. These time values may be stored in association with an identifier associated with an RFID tag that had been allowed or restricted access. The time values may be set to expire after a certain period of time, may only apply to particular access events or particular RFID tags, may be stored in a system database and/or log and/or used to calculate tracking data.

In one example, the system 20 is configured to localize an RFID tag at an endpoint by using hierarchical threshold limit calculations based on accumulated reading factors from groups of settings for RF interrogators. In one instance, localization of an RFID tag at E2A, E2B, or E2C as shown in FIGS. 2A and 2B could be performed by the RF reader 24c in this manner. In an alternate example, the system 20 is configured to use hierarchical probabilistic threshold calculations based on accumulated probabilities from groups of settings for RF interrogators. In an additional example, the system 20 is configured to use hierarchical threshold limit calculations based on accumulated reading factors from settings of groups of RF interrogators. In a further example, the system 20 is configured to use hierarchical probabilistic threshold calculations based on accumulated probabilities from settings of groups of RF interrogators. Each of the four examples is discussed in greater detail below. In each of the four examples, there are 'n' RF interrogators in the system designated as $RF_1$, $RF_2$ ... $RF_n$. There are 'm' endpoints defined in a network model, designated as $E_1$, $E_2$ ... $E_m$. There is one RFID tag in range of the system, and the system validates the tag's location as being at endpoint $E_i$. Although only one RFID tag is discussed for simplicity, it should be understood that multiple RFID tags can be tracked by the system 20.

In the first example, the system uses hierarchical threshold limit calculations based on accumulated reading factors from groups of settings for RF interrogators. In this approach each interrogator has an assigned collection of settings/configurations. For example, $RF_i$ might have an assigned collection including two settings while $RF_j$ might have a collection including five settings, with a setting being defined by values of any of the RF interrogator parameters or a combination of parameters such as transmitted RF power output, antenna gain, antenna polarization, and antenna orientation. There is also a weight associated with each setting of the RF interrogator, designated as $W_{k,l}$ where 'k' is the index for the RF interrogator and 'l' is the index for the interrogator's setting. For an endpoint $E_i$, there is a threshold value or interval (Tv) used in assessing whether a subject with an RFID tag is located at the endpoint. A threshold value or interval is also used in the other examples, but the particular value or interval may vary in each example.

In an interval of time, the system collects data for each setting of the RF interrogators with $NR_{k,l}$ representing the number of tag readings at the interrogator 'k' configured with the settings 'l' during the time interval. In a first step for endpoint $E_i$, the system calculates an aggregate result for each interrogator based on a weighting formula/function: $A_k=F_k(W_{k,l}, NR_{k,l})$ where 'k' is the interrogator index and 'l' spans all settings for interrogator 'k'. A second step includes aggregating the results obtained in the first step based on a weighting formula/function: $A=G(WA_k, A_k)$ where 'k' is the interrogator index and $WA_k$ is the weight associated with the interrogator k at the endpoint $E_i$. The aggregation result A is then compared with the threshold value or interval Tv to assess whether the tag is localized at endpoint $E_i$.

One example implementation of this first example can be described with reference to FIGS. 2A and 2B. The endpoint of interest Ei is E1. A RFID tag located at E1 may be read by all the interrogators 30 and 26. The interrogator 30 in reader 34 is assigned four settings: one setting for which the antenna is oriented as in the FIG. 2A with RF power output 36 dBm, one setting for which the antenna is oriented as in the FIG. 2A with RF power output 33 dBm, one setting for which the antenna is oriented at a 45 degree angle towards E1 as in FIG. 2B with RF power output 36 dBm and one setting for which the antenna is oriented at a 45 degree angle towards E1 as in FIG. 2B with RF power output 33 dBm. The antenna of the interrogator 30 associated with the reader 34 has vertical polarization. All the other interrogators have just one setting, with the antennas' orientations as shown in FIG. 2A and an RF power output of 33 dBm. All the interrogators' antennas have a fixed gain of 6 dBi. The interrogators 30 in the reader 32e have different antenna polarizations, one vertical, one horizontal and one circular. The first two settings of the interrogator 30 associated with the reader 34, corresponding to the antenna orientation shown in FIG. 2A, are assigned negative weights W1,1=(−0.4) and W1,2=(−0.5) because the antenna is vertically polarized and does not point toward E1, in such a way that it detects tags located away from E1. For the next two settings, the weights are higher and set at W1,3=0.5 and W1,4=0.4 respectively, because the antenna points toward EP1 and detects tags around EP1.

While the antennas may be oriented in a physical manner that directs them in an angular fashion such that the point toward a desired direction, it should be understood that they may alternatively (or in addition) be electronically steerable to encompass a preferred field of view.

The first two settings of the interrogator 30 associated with the reader 34 are used to detect that the tag is not likely at endpoint E1 but rather in the coverage area for this setting away from E1, because the interrogator antenna is oriented away from the location of E1; hence these settings have associated negative weights. For all the interrogators in reader 32e, there is a single setting with a weight of 0.8 (W2,1, W3,1, W4,1 are all 0.8). For E1, all the interrogators in reader 24c have null weights(0). The weights are calculated and determined using site surveys and simulations, for example. Weights associated with other functions and examples are determined in a similar fashion.

During an interval of time, such as 1 ms for example, the system collects data from all settings from all readers. For the interrogator 30 associated with the reader 34, it collects reading values for each setting and aggregates the values using an aggregation function. The aggregation function (F) for each interrogator for this example may be viewed as a sum of weights applied to the number of tag reads. In other examples, the aggregation functions for each interrogator might be different from each other. For the interrogator 30 associated with the reader 34, the readings are N1,1=16, N1,2=10, N1,3=2 and N1,4=0. For the interrogator 30 associated with the reader 34, the aggregate value becomes A1=W1,1*N1,1+W1,2*N1,2+W1,3*N1,3+W1,4*N1,4=(−0.4)*16+(−0.5)*10+0.5*2+0.4*0 (−10.4). For the three interrogators 30 associated with the reader 32e, the system collects one reading value N2,1=4, N3,1=2 and N4,1=0, respectively, with the not null readings coming from horizontally and circularly polarized antennas. The aggregate values for the interrogators 30 associated with the reader 32e become A2=W2,1*N2,1=0.8*4=3 0.2, A3=W3,1*N3,1=0.8*2=1.6 and A4=W4,1*N4,1=0.8*0=0, respectively. For the interrogators 26 associated with the reader 24c, the collected data doesn't matter in this example calculation because the weights associated with the interrogators 26 are null (in this example those interrogators are not taken into consideration while calculating position at E1). The final result is then computed as an aggregation of the particular results normalized with the weight associated with each interrogator.

The final aggregation function (G) for this example is a sum of the weights applied to the aggregated values for each interrogator from the previous step. In this example, the interrogator 30 associated with the reader 34 is assigned a weight of WA1=0.5, the interrogators 30 associated with the reader 32e each have a weight of 0.6 (WA2, WA3, WA4 are all 0.6), and as mentioned above all the other interrogators have null weights. Using these weights, the final aggregate value become A=WA1*A1+WA2*A2+WA3*A3+WA4*A4=0.5*(−10.4)+0.6*3.2+0.6*1.6+0.6*0 (−2.32). This value is compared with a previously determined threshold value Tv=1 which is assigned to E1. In this example, the threshold value is not reached which means that the subject is not in endpoint E1.

In the second example, the system uses hierarchical probabilistic threshold calculations based on accumulated probabilities from groups of settings for RF interrogators. This calculation is very similar with the previous one, except that in the first step of the calculations, weights are applied to a probability. For each interrogator setting there is a reference reading value that expresses the highest probability that the tag may be at endpoint $E_i$. This is represented as $C_{k,l}$ where 'k' is the index for the RF interrogator and 'l' is the index for the interrogator's setting. In a first step for endpoint $E_i$, the system calculates an aggregate result for each interrogator based on a weighting formula/function: $A_k=F_k(W_{k,l}, P_{k,l})$ where 'k' is the interrogator index, 'l' spans all settings for interrogator 'k' and $P_{k,l}=PF_{k,l}(NR_{k,l}, C_{k,l})$ is the probability that the tag is at endpoint $E_i$ as detected from interrogator 'k' in configuration 'l' calculated with the function $PF_{k,l}$. A second step includes aggregating the results obtained in the first step based on a weighting formula/function: $A=G(WA_k, A_k)$ where 'k' is the interrogator index and $WA_k$ is a weight associated with the interrogator 'k' at the endpoint $E_i$. The aggregation result A is then compared with a threshold value or interval Tv to assess whether the tag is localized at endpoint $E_i$.

An example implementation of this second example can be described with reference to FIGS. 2A and 2B. The endpoint of interest Ei is E1. A RFID tag located at EP1 may be read by all the interrogators 30 and 26. In this example, the interrogator 30 associated with the reader 34 is assigned four settings: one setting for which the antenna is oriented as shown in FIG. 2A with an RF power output of 36 dBm, one setting for which the antenna is oriented as shown in FIG. 2A with RF power output 33 dBm, one setting for which the antenna is oriented at a 45 degree angle towards E1 as shown in FIG. 2B with RF power output 36 dBm, and one setting for which the antenna is oriented at a 45 degree angle towards E1 as shown in FIG. 2B, with RF power output 33 dBm. For all settings, the antenna of the interrogator 30 associated with the reader 34 has vertical polarization. All of the other interrogators have just one setting, with the antenna orientation as shown in FIG. 2A, and an RF power output of 33 dBm. All of the interrogators' antennas have a fixed gain of 6 dBi. The interrogators 30 associated with the reader 32e have different antenna polarizations, one vertical, one horizontal and one circular.

The first two settings of the antenna of the interrogator 30 associated with the reader 34 correspond to the antenna orientation as shown in FIG. 2A, and are assigned weights of W1,1=0.5 and W1,2=0.5. The reference reading values are low values of C1,1=1 and C1,2=0 because the antenna is vertically polarized and does not point toward EP1, such that it detects tags located away from E1. For the next two settings, the weights are higher W1,3=1 and W1,4=0.9 respectively and the reference reading values are higher values of C1,3=10 and C1,4=9, because the antenna points toward E1 and detects tags located near E1. For all of the interrogators 30 associated with the reader 32e, there is a single setting with a weight of 0.9 (W2,1, W3,1, W4,1 are all 0.9) with a reference reading value of 12 (C2,1, C3,1, C4,1 are all 12). For E1, all of the interrogators 26 associated with the reader 24c have null weights(0). The weights and the reference reading values are calculated and determined using site surveys and simulations, for example.

During an interval of time, such as 1 ms for example, the system collects data from all interrogators for all settings. For the interrogator 30 associated with the reader 34, the system collects reading values for each setting and aggregates the values using an aggregation function. The aggregation function(F) for each interrogator for this example is the average of the weights applied to the probability that the tag is at the endpoint E1 for each interrogator setting. The probability that the RFID tag is at endpoint E1 for each interrogator setting is computed based on a probability function P(N, C) which in this example is: for the first two settings of the interrogator 30 associated with the reader 34 (P1,1, P1,2)={0 if N>C, 0.5 if N<=C}; for the last two settings of the interrogator 30 associated with the reader 34 (P1,3, P1,4)={0 if N=0, C/N if N>C, N/C if N<=C}; and for all settings of the interrogators 30 associated with the reader 32e (P2,1, P3,1, P4,1)={0 if N=0, C/N if N>C, N/C if N<=C}. For the interrogator 30 associated with the reader 34, the readings are N1,1=0, N1,2=0, N1,3=8 and N1,4=7. For the interrogator 30 associated with the reader 34, the aggregate value becomes A1=(W1,1*P1,1+W1,2*P1,2+W1,3*P1,3+W1,4*P1,4)/4=(0.5*0.5+0.5*0.5+1*8/10+0.9*7/9)/4=2/4=0.5. For the three interrogators 30 associated with the reader 32e the system collects three reading values N2,1=14, N3,1=12 and N4,1=6, respectively. The aggregate values for the interrogators 30 associated with the reader 32e become A2=(W2,1*P2,1)/1=0.9*12/14=0.77, A3=(W3,1*P3,1)/1=0.9*12/12=0.9 and A4=(W4,1*P4,1)/1=0.9*6/12=0.45 respectively. For the interrogators 26 associated with the reader 24c, the collected data doesn't matter in this example calculation because the weights associated with the interrogators 26 are null (in this example those interrogators are not taken into consideration while calculating position at E1).

The final result is then computed as an aggregation of the particular results normalized with the weight associated with each interrogator. In this example, the interrogator 30 associated with the reader 34 has a weight of WA1=0.8, the interrogators 30 associated with the reader 32e each have a weight of 0.9(WA2, WA3, WA4 are all 0.9) and, as mentioned above, all the other interrogators have null weights. The final aggregation function (G) for this example is the average of the weights applied to the aggregated values for each interrogator from the previous step. The final aggregate value become A=(WA1*A1+WA2*A2+WA3*A3+WA4*A4)/4=(0.8*0.5+0.9*0.77+0.9*0.9+0.9*0.45)/4=(0.40+0.69+0.81+0.41)/4~0.57. This value is compared with a previously determined threshold value Tv=0.50 which is assigned to E1. In this example, the threshold value is reached which means that the subject is at endpoint E1.

In the third example, the system uses hierarchical threshold limit calculations base on accumulated reading factors from settings of groups of RF interrogators. In this approach a group of interrogators has an assigned collection with any number of settings/configurations. For example, four RF interrogators at an access door might have an assigned collection including two settings, with a setting being defined by the combination of any RF interrogators' parameters such as transmitted RF power output, antenna gain, antenna polarization, and antenna orientation. There is a weight associated with the endpoint $E_i$ for each setting of a group of RF interrogators. There is also a weight associated with each interrogator from the group configured with each of the group settings; this is represented as $W_{k,l}$ where 'k' is the index for an RF interrogator in the group and 'l' is the index for the group's setting. In an interval of time, the system collects data for each setting of the group of RF interrogators with $NR_{k,l}$ representing the number of readings at the interrogator 'k' configured with the group setting T. In a first step for endpoint $E_i$, the system calculates an aggregate result for each group setting based on a weighting formula/function: $A_l=F_k(W_{k,l}, NR_{k,l})$ where 'k' is the interrogator index in the group and 'l' spans all settings for the interrogator group. A second step includes aggregating the results obtained in the first step based on a weighting formula/function: $A=G(W A_l, A_l)$ where 'l' is the group setting index and $WA_l$ is a weight associated with the group setting 'l' at the endpoint $E_i$. The aggregation result A is then compared with a threshold value/interval Tv to assess whether the tag is localized at endpoint $E_i$.

An example implementation of this third example can be described with reference to FIGS. 2A and 2B. The endpoint of interest Ei is E1. A RFID tag located at E1 may be read by all the interrogators 30 and 26. All of the interrogators 30 represent a group used to detect whether the subject is at endpoint E1. The group of interrogators includes group settings, which are a collection of particular settings for each interrogator. In this example, two group settings are defined.

The first group setting includes: a setting for the interrogator 30 associated with the reader 34 where the antenna is oriented at a 45 degree angle towards E1 as shown in FIG. 2B, with interrogator RF power output 33 dBm and antenna polarization circular; a setting for each interrogator 30 associated with the reader 32e where the antenna is oriented as in FIG. 2A, with interrogator RF power output 36 dBm and antenna polarization vertical. For this first group setting, the weight associated with the interrogator 30 associated with the reader 34 is W1,1=0.9 and the weights associated with the interrogators 30 associated with the reader 32e(W1,2, W1,3, W1,4) are all 1, which means that all reads from all the interrogators in the group will count during the aggregation calculation for this group setting.

The second group setting includes: a setting for the interrogator 30 associated with the reader 34 where the antenna is oriented as in FIG. 2A, with interrogator RF power output 36 dBm and antenna polarization vertical; the settings for the interrogators 30 associated with the reader 32e don't matter because these interrogators are associated weights of 0 for this group setting and they don't count during the aggregation calculation of this group setting. In this example, the second group setting may help detect that the tag is not likely to be at endpoint E1, but rather in the coverage area for this group setting away from E1 because the only interrogator antenna that counts is oriented away from the location of E1. However, this is just a particular case and should not limit the generality of the algorithm. For the second group setting, the weight associated with the interrogator 30 associated with the reader 34 is a negative value W2,1=−0.9 because the interrogator settings allow detection in an area away from EP1 and the weights associated with the interrogators 30 associated with the reader 32e(W2,2, W2,3, W2,4) are all 0 which means that all the reads from the interrogators 30 associated with the reader 32e will not count during the aggregation calculation for this group setting. In this example, all the interrogators' antennas have a fixed gain of 6 dBi.

In an interval of time, such as 1 ms for example, the system collects data from both group settings: for the first group setting the number of reads at the interrogator 30 associated with the reader 34 is N1,1=2 and for each interrogator 30 associated with the reader 32e, the number of reads are N1,2=0, N1,3=1, N1,4=2, respectively. For the second group setting, the number of reads at the interrogator 30 associated with the reader 34 is N2,1=10 and for each interrogator 30 associated with the reader 32e, the number of reads are N2,2=0, N2,3=1, N2,4=2, respectively. For each group setting, the system aggregates the values using an aggregation function. In this example, the aggregation functions(F) for each group setting can be considered as a sum of weights applied to the number of tag reads for each interrogator in the group. In other examples, the aggregation functions for each group setting might be different from each other.

For the first group setting, the aggregate value becomes A1=W1,1*N1,1+W1,2*N1,2+W1,3*N1,3+W1,4*N1,4=0.9*2+1*0+1*1+1*2=(4.8). For the second group setting, the aggregate value becomes A2=W2,1*N2,1+W2,2*N2,2+W2,3*N2,3+W2,4*N2,4=(−0.9)*10+0*2+0*1+0*0=(−9).

The final aggregation function(G) for this example is the sum of the group settings' weights applied to the aggregated values for each group setting from the previous step. The first group setting is assigned a weight of WA1=0.9 while the second group setting is assigned a weight value of WA2=0.8. Any weight might have a positive or negative value. The final aggregate value become A=WA1*A1+WA2*A2=0.9*4.8+0.8*(−9)=(−2.88). This value is compared with a previously defined threshold value Tv=3 which is assigned to E1. In this example, the threshold value is not reached which means that the subject is not at endpoint E1.

In the fourth example, the system uses hierarchical probabilistic threshold calculations based on accumulated probabilities from settings of groups of RF interrogators. This calculation is very similar to the third example, except that in the first step of the calculations weights are applied to a probability. For each group setting there is a reference reading value that expresses the highest probability that the tag may be at endpoint $E_i$, noted with $C_{k,l}$ where 'k' is the index for an RF interrogator in the group and 'l' is the index for the group's setting. In a first step, the system calculates for endpoint $E_i$ an aggregate result for each group setting based on a weighting formula/function: $A_l = F_k(W_{k,l}, P_{k,l})$ where 'k' is the interrogator index in the group, 'l' spans all settings for the interrogator group and $P_{k,l} = PF_{k,l}(NR_{k,l}, C_{k,l})$ is the probability that the tag is at endpoint $E_i$ as detected from interrogator 'k' in group configuration 'l' calculated with the function $PF_{k,l}$. A second step includes aggregating the results obtained in the first step based on a weighting formula/function: $A = G(WA_l, A_l)$ where T is the group setting index and $WA_l$ is a weight associated with the group setting T at the endpoint $E_i$. The aggregation result A is then compared with a threshold value/interval Tv to assess whether the tag is localized at endpoint $E_i$. In all of the configurations described with respect to the four examples, the weights and the threshold values including reference reading values can be statically defined and/or computed during execution using a learning algorithm.

An example implementation of this fourth example can be described with reference to FIGS. 2A and 2B. The endpoint of interest Ei is E1. A RFID tag located at E1 may be read by all the interrogators 30 and 26. All of the interrogators 30 represent a group used to detect whether the subject is at endpoint E1. The group of interrogators includes group settings which are a collection of particular settings for each interrogator. In this example, two group settings are defined.

The first group setting includes: a setting for interrogator 30 associated with the reader 34 where the antenna is oriented at a 45 degree angle towards E1 as shown in FIG. 2B, with interrogator RF power output 33 dBm and antenna polarization circular; a setting for each interrogator 30 associated with the reader 32e where the antenna is oriented as shown in FIG. 2A, with interrogators RF power output 36 dBm and antenna polarization vertical. For this first group setting, the weight associated with the interrogator 30 associated with the reader 34 is W1,1=0.9 and the weights associated with interrogators 30 associated with the reader 32e(W1,2, W1,3, W1,4) are all 1 which means that all the reads from all the interrogators will count during the aggregation calculation for this group setting. The reference reading value for the interrogator 30 associated with the reader 34 configured with this group setting is C1,1=10. This is a high value because the antenna in this setting is circularly polarized and points directly toward E1 such that it detects tags located near E1. For the other three interrogators in the group configured with this group setting, the reference values are C1,2=10, C1,3=10 and C1,4=9. These are high values because these interrogators' antennas point toward E1 and detect tags located near E1.

The second group setting includes: a setting for the interrogator 30 associated with the reader 34 where the antenna is oriented as shown in FIG. 2A, with interrogator RF power output 36 dBm and antenna polarization vertical. The settings for the interrogators 30 associated with the reader 32e don't matter because these interrogators are associated with weights of 0 for this group setting and they don't count during the aggregation calculation of this group setting. For the second group setting, the weight associated with the interrogator 30 associated with the reader 34 is a lower value $W2,1=0.4$ because the interrogator settings allow detection in an area away from the E1 location and the weights associated with the interrogators 30 associated with the reader 32e($W2,2$, $W2,3$, $W2,4$) are all 0.9 which means that all the reads from the interrogators 30 associated with the readers 32e will count during the aggregation calculation for this group setting. The reference reading value for the interrogator 30 associated with the reader 34 configured with this group setting is $C2,1=0$. This is a low value because the antenna in this setting is vertically polarized and points in a direction away from E1, such that it detects tags located away from E1. For the other three interrogators in the group configured with this group setting, the reference values are $C2,2=10$, $C2,3=10$ and $C2,4=9$. These are higher values because these interrogators' antennas point toward E1 such that they detect tags around EP1. In this example, all the interrogators' antennas have a fixed gain of 6 dBi.

In an interval of time, such as 1 ms for example, the system collects data from both group settings: for the first group setting the number of reads at the interrogator 30 associated with the reader 34 is $N1,1=2$ and for each interrogator 30 associated with the reader 32e, the number of reads are $N1,2=0$, $N1,3=1$, $N1,4=2$ respectively. For the second group setting, the number of reads at the interrogator 30 associated with the reader 34 is $N2,1=10$ and for each interrogator 30 associated with the reader 32e, the number of reads are $N2,2=0$, $N2,3=1$, $N2,4=2$ respectively.

For each group setting, the system aggregates the values using an aggregation function. The aggregation function(F) for each group setting for this example is the average of the weights applied to the probability that the tag is at the endpoint E1 for each interrogator setting. The probability that the RFID tag is at endpoint E1 for each interrogator configured with the group setting is computed based on a probability function $P(N, C)$ which in this example is: for the first group setting of the interrogator 30 associated with the reader 34($P1,1$)=$\{0$ if $N=0$, $C/N$ if $N>C$, $N/C$ if $N<=C\}$; for the second group setting of the interrogator 30 associated with the reader 34 ($P2,1$)=$\{0$ if $N>C$, $0.5$ if $N<=C\}$; and for all the interrogators 30 associated with the reader 32e group settings ($P1,2$, $P1,3$, $P1,4$, $P2,2$, $P2,3$, $P2,4$)=$\{0$ if $N=0$, $C/N$ if $N>C$, $N/C$ if $N<=C\}$.

For the first group setting, the aggregate value becomes $A1=(W1,1*P1,1+W1,2*P1,2+W1,3*P1,3+W1,4*P1,4)/4 = (0.9*2/10+1*0/10+1*1/10+1*2/9)/4$ $0.52/4=0.13$. For the second group setting, the aggregate value becomes $A2=(W2,1*P2,1+W2,2*P2,2+W2,3*P2,3+W2,4*P2,4)/4=(0.4*0+0.9*0/10+0.9*1/10+0.9*2/9)/4 \sim 0.29/4 \sim 0.07$. The final aggregation function (G) for this example is the average of the group settings' weights applied to the aggregated values for each group setting from the previous step. The first group setting is assigned a weight of $WA1=0.9$ while the second group setting is assigned a weight value of $WA2=0.8$. Any weight might have a positive or negative value in other examples.

The final aggregate value becomes $A=(WA1*A1+WA2*A2)/0.2=(0.9*0.13+0.8*0.07)/2 \sim 0.087$. This value is compared with a previously defined threshold value $Tv=0.50$ which is assigned to E1. In this example, the threshold value is not reached which means that the subject is not at endpoint E1.

For each of the weighting formulas above, the weights are numerical values (real numbers). Any of the weights might have a positive or a negative value. An example of an aggregation function F or G is a sum of weights applied to each number to be aggregated Funct($Wn$, $Nn$)=SUM ($Wn*Nn$) where n is an integer. Another example of an aggregation function(G) is an average of weights applied to each number to be aggregated Funct($Wn$, $Nn$)=SUM ($Wn*Nn$)/M where n is an integer spanning from 1 to M. Although specific values have been used in the examples above, it should be understood that the system is not limited to using the example values.

In an example embodiment, the system 20 is dynamically configurable to allow a system administrator, for example, to define intervals of time in which RFID tag reading at one or more endpoints is performed in a manner that is different than the manner in which RFID tags are read at the identified endpoints during other time intervals. This functionality can be used to provide more stringent security settings at differing times of day. The system adjusts the RF settings of the endpoint's RF interrogators and their associated weights to values that correspond to a desired level of RFID tag reading performance. As an example, for an endpoint used to read RFID tags for access to a building or room during off hours, the system settings may have high weights for settings corresponding to low transmitted RF output power, low antenna gain, and linear polarization of external interrogators at building access locations, but very low or null weights for other settings. This results in RFID tags being sensed at a shorter range during the off-hours interval than during the regular hours interval and requires a close proximity of an RFID tag to an external antenna before access is allowed. In one example, an RF signal strength setting is adjusted based on the received time interval and associated security level setting. In some embodiments, the time interval and associated security level setting may be entered once and kept in a system configuration. In other embodiments, the time interval and associated security level setting may be changed by the system administrator or other authorized users.

In one example, a system administrator defines a first regular-hours interval of time from 8 am-8 pm, a second off-hours interval from 8 pm-10 pm and a last interval from 10 pm to 8 am when no access is allowed. The system settings for the off-hours interval have high weights for settings corresponding to low transmitted RF output power, low antenna gain, and linear polarization of external interrogators at building access locations but very low weights or null weights for other settings. This results in RFID tags being sensed at a shorter range during the off-hours interval than during the regular-hours interval and requires a close proximity of an RFID tag to an external antenna before access is allowed. Alternatively, the system settings may be set such that RFID tags are more easily sensed at a longer range during the off-hours interval than during the regular-hours interval. This could possibly be desirable if an entrance were located such that many people with RFID tags pass by the entrance during the regular-hours interval without having an intention of entering, but people with RFID tags after-hours generally pass through the entrance if they are detected nearby.

Returning to the use of semantics, the following describes a further implementation of semantics with RFID. Semantic RFID is a novel concept and technology that uses RFID and sensing semantic models of buildings and facilities in order to automatically determine, manage and control the semantics of movements of objects.

The Semantic RFID system uses collaborative sensing, localization and tracking techniques for recording and inferring the semantics of objects traveling through the semantic modeled facilities. The semantics can range from very simple determinations as entering or exiting an area or direction of travel to more complex determinations as checkout, returns, boarding, carry luggage, expired items, unsafe to consume etc. and is based on travel sequences and interactions in the semantic field. The applicability of semantic sensing is potentially endless.

In some examples, the semantic determinations are based on system internal observed semantics and can be coupled with system external semantics The semantic engine gathers information from sensing and control entities including sensors, digital and analog I/O devices, RFID sensors and readers, RFID tags and any other managed entities. The sensing entities may be independent or attached to a monitored entity including washer/dryer, refrigerator, cars, medical devices, human body, environment, doors etc. The sensors include internal, external, environmental, wearable, biological, human-centric, digital, analog, industrial, building or any other type. They can communicate via wired or wireless connections; a particular case of a sensor is a one that is connected to a wireless circuit, tag or device; this provides the ability for the sensor values to be read via a wireless reader, can store sensed information in time and can be read or processed when communication via wireless protocols is available. The sensors might be of different types and can store a history of measurements and/or provide real time data that can be sampled anytime or at time intervals; additionally, the sensor may have notification capabilities that notify observers of the measured values or any type of activity in the monitored environment.

The system might issue control commands to sensing and control entities for any purpose including the reset of the device, change parameters, open/close/activate/deactivate commands, change notification settings, change sample data etc.

The semantic engine may couple the system internal sources with system external sources including electronic calendars, RSS feeds, social graphs, electronic forum posts, electronic organizational charts and any other external to the system.

The system internal semantics can be based on travel sequences, interactions in the semantic field and sensing or a combination of all of those.

The semantic determinations can have an expiration time or a validity interval in the sense that once determined the system might invalidate these determinations when the expiration time is reached or the validity interval passes.

The semantic chain may include any type of definitions, determinations, compositions, interdependencies, timing, inference models and techniques for any type of semantics or semantic groups and may be continuously developed by inference and learning techniques.

A semantic group consists of at least two entities each being monitored in the semantic field that share a semantic relation or commonality; semantic groups can be structured in a composite fashion with at least two semantic groups forming another composite semantic group; for composite semantic groups similar semantic rules between its members apply as for a semantic group. As such, the semantic groups can form and be represented as a hierarchical type structure.

For a semantic group, a group semantic can be assigned and can be group dependent when the semantic is a semantic event of one entity in rapport with another within the same group; or, group independent semantic when the semantic is not determined by the interactions between the group members.

A semantic group can be inferred based on interactions in the semantic field; further, the system may use categories of RFID tags and sensing entities to create rules or templates for semantic group formations (e.g. the system may define tag categories for items and cars and define a rule that semantic groups should be created when at least one member of an item category interacts with a member of a car category in a specific way; another example of tag categories are in the case of an employee which is has assigned one tag/card from the category PARKING and one from BUILDING ACCESS).

Any semantics can be combined at any time in order to infer new semantics. As such the semantics can be simple semantics which are derived from the determinations in the semantic field, composite when are determined from a combination of other determined semantics, or complex when they are determined from any combination of the former. As an example for a manufactured product lifecycle, simple semantics can be "PACKAGED" (when the semantic is inferred based on the packaging area link), "STORED" (inferred for a warehouse link), "SHIPPED" (inferred for a loading area), "LOAD" (inferred when loading a truck) and "UNLOAD" (inferred when unloading from the truck). A composite semantic of these can be "DELIVERED" because the tagged product went through the required delivery lifecycle. Further, if for the same tagged article a semantic of "LOAD", "UNLOAD" and "RECEIVED" was determined then a further composite semantic of "RETURN" and/or "PENDING REFUND" can be derived.

The semantics may be represented as a hierarchy and the semantics are inferred based on the hierarchy traversal.

A semantic structure might have costs associated with its data and semantics; the system might trigger or prefer one semantic or the other based on costs calculations.

The semantic structure may use timing enhancements for facilitating the time dependent semantic determinations The semantic inference can be time sensitive as for example a composite or complex semantic is not inferred unless some semantic determinations used for its determination are complying with timing requirements; the timing requirements can include being within an interval of time (e.g. in the product lifecycle example the "PENDING REFUND" semantic might not be inferred if the timing between DELIVERED and RECEIVED would have been longer than 30 days; instead a semantic of type "RESTOCKING REFUND" might have been more suitable, or as an alternative a combination of "PENDING REFUND" and "RESTOCKING FEE". Similarly, any group semantic can be time dependent in the sense that it may require some of the events that trigger the semantic inference to comply with certain timing requirements etc.

Composite semantics can have assigned to them determination spans which control the maximum amount of time between the start of composite determination to the end of the composite determination. In some versions if the component semantics of a composite semantic are not realized within the determination span then the composite semantic is not inferred. The determination span can be a time interval or a semantic interval. Further, a composite semantic might be considered valid only if it matches a sequencing rule in which the component semantics occur in a specific order. Further, a composite semantic might be deemed as exclusive and be validated only if it matches an exclusivity rule where there are no other semantics occurring during its semantic determination except the composite semantics that define it; a non-exclusive composite semantic can be inferred even there are other semantics occurring besides the component semantics during its semantic determination. The semantic determination can have expiration times which are used by the system to invalidate determined semantics once the expiration time passes.

The semantic timing definitions and determinations including the expiration time can be defined as a time threshold, as a time interval and, further, as an interval based on semantics; the interval based on semantics is basically a time interval between when the interval semantic boundaries occurred or expired.

The semantics assigned to a tag or group of tags can have expiration times; as such, the expired semantic will not participate in additional composite semantic inference once the semantic is expired. The composite semantic determinations can also have other time rules that determine the semantic inference including semantics that expire based on other semantics, semantics inferred and/or validated based on an interval of time and any other time sensitive inference. The time insensitive semantics are the ones that never expire or do not require time determinations to be validated; those can be simple semantics or composite as a result of composition of any type of semantic; they can be used to compose any other type of semantics. As an example, the time sensitive semantic determinations help with implementation of the exclusion zones (e.g. for hazardous substances interaction) as an example in a pharmaceutical facility if a tag has been assigned a semantic of "PATHOGEN" because it visited a highly sensitive laboratory testing area then it shouldn't be allowed to enter for the next 24 hours in the generic drugs manufacturing area; in this case we can define the semantic as having an expiration time of 24 hours and define a block access control rule for this semantic; hence the tag may be allowed to enter the generic drugs area only after the "PATHOGEN" semantic expired and which is 24 hours. Further, when the "PATHOGEN" semantics expire the system may infer that the tag is in a clean state and infer other semantics throughout the system.

A preferred method for the operation of semantic determination is one in which the system monitors the semantic field through the sensing entities and the RFID readers and keeps data structures tracking the semantics definition, semantic sequencing, semantic intervals definitions and the semantics that have been occurred. The system may detect that the conditions for a tag or a plurality of tags have been met for determining a semantic or group semantic, where the conditions may include using any combination of a detected endpoint presence, sensing entity value, link passing, input from a user, other inferred semantic, external semantic or tag to tag semantic marking. Once the new semantic or group semantic is inferred based on the field data and the semantic definitions the system further checks the semantic definitions to identify all the composite semantics that are defined based on this component semantic. Then, for each identified composite semantic the system checks if all composite semantics are realized and if the other semantic rules including the span, exclusivity rule and sequencing rule are met. In one version the system will not consider in the determination the semantics for which the expiration time have passed; that is, it will automatically reject such semantics. If the rules are met then the system infers the composite semantic and, further may use the inferred semantic to determine other composite semantics in a recursive manner. If a tag is at an endpoint that enforces access control and if there is at least one realized semantic (which may be a composite semantic) that will match one access control rule that allows the tag to pass then the system may allow the tag to pass to a second controlled endpoint. The system may check the semantic intervals rules and see which one is in effect or not and the system determines, based on semantic intervals and the semantic sequencing, whether the determined semantic is within a matching semantic interval. Based on the determination of whether the semantic is or not within a semantic interval the system might ask for a user input, might trigger an event or alarm, further use the semantic rules for semantic inference or create/update system records. The system might also determine based on the group semantics definitions and sequencing that any of the realized semantics lead to a group semantic between this tag and possibly other tag or group of tags and further recursively execute the process described above. Further, the system may use the group semantic determination to instruct the RFID readers to monitor the particular semantic group by issuing a list or mask for filtering the particular tags in the semantic group. In this way the RFID interference might be reduced and the semantic group can be monitored more effectively until the system determines that to be no longer necessary or until a new semantic rule come into effect.

Further, the system may store the semantic determinations and expirations to tags' memory. For example, this can be useful if there is no network connectivity between two facilities and the system should rely on the information stored on tags for semantic inference, access control, time management and semantic chain development.

A tag memory may store semantic inference rules that the tag uses to infer semantics and store them to the local memory. Further, the system might retrieve and manage the semantic determinations stored on the tag. Also, the tag memory may store the semantic groups to which it belongs.

The oriented links preferably have semantic attributes assigned to them; the semantic attributes can be defined or inferred as dependent on a sensing entity measurement or status. As an example, if in a disinfection area a sensor senses that the concentration of disinfectant is below the required standard the system might change the semantic attribute of the entry and/or exit links from the disinfection area from SAFE to HAZARDOUS; or, the system may select the link semantic based on the measured value and an interval-semantic configuration or data structure. Further, the system might assign to all the tags present in the disinfection area a hazardous related type semantic. Thus, in one version a semantic attribute is a function of an oriented link and at least one additional parameter unrelated to the geographic relationship between the links.

Group dependent semantics may be derived, for example, in any of the following situations.

In one example, the semantic group follows certain paths and patterns of movement. As an example imagine a person who is wearing a library badge and is carrying RFID tagged books throughout a library (the person and the books are identified in the same locations and/or use the same paths and links within an interval of time, and therefore they are assigned to the same semantic group) and the semantic assigned to the books can be that the person checked them out from the library once the semantic group uses a "CHECKOUT" link in the library. In one version, once the books and the tag associated with the person pass an exit checkpoint the CHECKOUT semantic is applied to the group. Also, the system might create a new semantic group and further track the semantic group, possibly by using a filter or mask based on the semantic group.

In another example, the semantic group passes certain oriented links, eventually, within an interval of time; additionally, if required, a manual input can be used for additional usages and determinations including to differentiate between same type of objects in the same location, for entering additional authentication or authorization information or to manually add additional semantic information. For example, a person badge and a tracked luggage pass the same oriented link in an interval of time, the system infers that the luggage belongs, is in possession or has been checked out by that person. If multiple person tag badges or luggage tags are detected within the interval of time in the same locations or using the same links, a manual input may be required by the badges holders to specify the luggage belonging to them and, possibly, providing other additional information. The access control subsystem may enforce the manual input requirement by impeding the badge wearer or the tagged luggage to traverse the oriented link unless an input is received; this may include denying access to the destination point of the link, raising an alarm, triggering an event, inferring a semantic, setting up an internal parameter or any other means that may be required by such an access rule. The manual input is then used to help derive a group dependent semantic between the tag badges and baggage tags or any other group independent semantic. Another example may take place in a warehouse and a dock in the receiving area. When a truck unload event occurs the system can be setup so that the perishable items are unloaded to a specific location, eventually via a "PERISHABLE" link while the non-perishable items are unloaded to a second separate location, eventually via a "NON-PERISHABLE" link. In some versions, where links are used, they can even be on the same path and following the same direction with the exception that one of them may have a shorter distance to travel. Additionally, a location and an interval of time may also be used as an internal semantic for an item or group of items, e.g. the fact that an item is present in a certain area between certain times of the day may determine the system to infer a PERISHABLE semantic. Similarly, the semantic inference for the semantic group can be enabled/disabled within time intervals, semantic intervals or be enabled or disabled when required; the intervals may be controlled or replaced by other semantic events, internal or external e.g. a GPS monitored truck arriving in the docking area defines the semantic "TRUCK IN" which is used as a starting point to enable the PERISHABLE semantic inference.

In yet another example, when items are in the same location at any point in time it can be interpreted to mean that they interacted in one way or the other. While they are in the same location they may be coupled with sensorial information related with particularities at that location, sensorial information related with any of the tagged objects or sensorial information related with interaction between them. As an example if tagged goods are in a refrigeration area and a temperature sensor senses a temperature below freezing for an interval of time then the system might assign to any of those tags the semantic "EXPIRED" which means that they will be monitored and controlled in a specific way in the semantic field. Another example might include at least two people in a facility that are in close proximity/location and a sound/speech sensor senses a sound of a specific pitch in the area then the system might infer a semantic of type "ACUSTOMIZED", "NETWORKED" or "DISCUSSION" for the semantic group based also on the duration of the interaction. Wearable sensors can also sense different vital signs within the same or close interval of time when two or more people are detected in close proximity and then assign a semantic attribute based also on those e.g. "RELAXED" or "ALERT". The combination of these prior determined semantics for the group of people may lead to specific and complex or composite semantics e.g. "COMPATIBLE" as a combination of "NETWORKED" and "RELAXED" or "RELAXED" for a combination of "DISCUSSION" and "RELAXED". RFID enabled sensors can also be used and the system may access the sensing data and, possibly, localize the sensor via RFID. In another example RFID temperature sensors might be attached to goods in the refrigeration area and once the system receives the sensors data it might use it to infer additional semantics for the RFID tagged object. The RFID sensor may optionally provide real time sensing data and, possibly, preserve a history of sensor measurements and sampling at different interval of times, and the system may analyze the data from the sensor and detect that at one interval the temperature dropped below safe levels. In this case the system assign the semantic EXPIRED to the RFID tagged object.

As another example, the tags may have a certain pattern of movement and/or sensed values (e.g. a group of RFID moisture sensors, affixed to certain water sensitive plant (cultures) spread across an area, sense an over-humid condition when a specific tagged humidifier device passes the area. The humidifier might have chosen a path that would have determined to carry more moisture in the air than required, maybe because it had to pass through water, or use a specific charging pump or any other reason. Also, the moisture sensors might sense that while the humidifier passes through the area, the humidity measurements pattern decreases as the humidifier body dries out, finishes its water sources or passes through very warm areas. The humidifier itself might have a moisture and/or temperature sensor attached that might detect whether has passed through wet and very warm areas. Further, while passing through warm areas, temperature sensors in the area or affixed to the humidifier itself might detect this condition and be further used for more complex semantics. As such, semantics are inferred based on the path of movement, pattern of sensed values or any combination of these.

In a further example, the tags in the semantic field are interacting in such a way in which at least one of the tags becomes invisible to the semantic system when in close vicinity to another tag; e.g. an item is tracked to a warehouse and at a point in time is detected within the close proximity or location with a truck. If later the item became invisible, very likely because the tag cannot be read due to being loaded into the truck, the system may create a group semantic and possibly further a semantic group with all the articles that follow the same pattern (as loaded in the truck) or between the item tag and the truck tag; additionally, the system may use during the process a semantic assigned previously to the truck (e.g. RFID DISABLED which may have been assigned to the truck, possibly, just because the system detected that an article first detected at location A but disappeared from the semantic field for an interval of time, reappeared at the location B and the out of field time matches the time interval of the truck moving from the location A to location B)

The detection of the disappearance of one tag from the semantic field and the semantic inference can be further improved based on the detected absence of the response of a group of tags from a semantic group that includes the tag. The system may infer that the tag has disappeared from the semantic field only if at least one other tag or, in some situations all tags from the semantic group have disappeared from the semantic field. As an example, this may be the case if the tags are grouped together in a pallet or they travel together.

Tag to tag communication can be used to identify a semantic group and assign a semantic to the semantic group.

Further, tag to tag communication can be used to detect the disappearance of a semantic group.

The group independent semantics can also be determined in similar fashion as the group dependent semantics with the difference that the semantics are not inferred based on the interactions within the group.

Also combinations between any of simple tag semantics, group dependent semantics and/or group independent semantics can lead to additional tag semantics, semantic groups and group semantics and add up to the semantic chain. These can be based on mathematical logic theory or any other deductive logic and inference techniques (e.g. transitivity—if the person A and person B are assigned a group dependent semantic "COMPATIBLE" and person B and person C also has been assigned "COMPATIBLE" then A and C are "COMPATIBLE"; or, person A and person B are assigned a group dependent semantic "FRIENDS" and person A and person C also has been assigned "FRIENDS" then B and C can form their own semantic group "FRIENDS OF A" and further person A and the group "FRIENDS of A" can form a semantic dependent group. As it can be seen the single tag semantics and group semantics whether dependent and independent can be mixed in various ways based on various inference techniques.

The techniques described above coupled with additional sensing information can be used to generate additional semantics and semantic groups and infer relationship between them.

Additionally, a tracked artifact may be assigned different semantics based on the path followed as explained throughout the application.

One aspect of the implementation of semantic enabled products is the semantic modeling which is the process that establishes the relationships between the characteristics and goals of the operational process to the facilities network layout. Various localization techniques are employed based on the specifics of each layout for optimized semantic inference.

The semantic engine can be used, potentially, with commercially available hardware; improved localization and semantic inference is achieved if the hardware implements advanced operational control and synchronization.

The localizations, RFID tag readings and sensing accuracy may be influenced by the number of the tagged entities in the semantic field. As such the system may adjust its RFID readings, localization and sensing parameters based on the tag population in the field. Additionally, the localization system uses tag filtering and selection techniques on an as needed basis in order to adjust parameters, tune the system and improve localization and semantic determinations. As an example, the system might decide, that it needs to read only specific tags from the semantic field for particular locations; in this case the system may instruct the readers to mask, filter and/or select only the tags of interest; the mask, filter and/or selection may select a tag based on the information stored in its memory including, but not limited, to a global identifier, group identifier, type identifier, stored data value, stored sensed data recording etc.

The system may adjust reader to tag protocol parameters including data rate, the reference time interval, modulation, encoding and slot count (used for collision mitigation protocols). Further, the system may adjust its parameters based on the type of tag because different tag types have different response times and operational particularities. Other adjustments might take into account the size and the type of the memory to be read by selecting or masking based only on the memory of interest etc. The semantic groups can also determine the adjustment of reader to tag protocol parameters; this may happen when the system is focused on the detection and tracking of particular semantics groups; this may be based on the size of the semantic group, its localization or any other parameters associated with the semantic group.

Semantics determinations for a tag can be also stored in the tag memory and can be used by the system for semantic inference. The tag memory can also store semantic groups and/or the identification of which groups the tag belongs.

The semantic data stored on the tag memory can be generated by the tag itself based on locally stored semantic determinations rules or can be generated and stored on the tag by the system via a reader or other tags. If the system and the tags implements tag to tag communication, the system may use tag to tag semantic marking in which the semantic data and/or semantic selection commands might be transmitted from tag to tag via standard or tag to tag protocols. Further, once receiving data or a request from another tag a current tag may store the received data and/or commands and/or infer additional semantics. The additional semantics may be based possibly on the received data, communication parameters, internal memory data, internal semantic circuitry or any combination of former. Further, the semantic data might be stored on the tags internal memory and circuitry and be used at any time for semantic selection and/or determination via reader to tag or tag to tag communication. The system may use masking, filtering and/or selecting techniques based on single tags, semantics, semantic groups and semantically connected tags. This will allow the system to identify and communicate with the tags in more efficient manner and to avoid unnecessary interference and communication in the semantic field. The system may also adjust the protocol parameters based on the size of the population being interrogated and which can be based on single or multiple tags, semantic attributes, semantic groups or semantic relationships. In one selection technique the system may provide the readers with the masks and/or the selection filters and then the readers send selection commands with the masks and/or selection filters to the tags; once a tag checks its memory or registers and identifies that the requested memory and/or values comply with the filters and/or masks it may set an internal selection flag or session and/or, sends the requested data back to the reader; the selection flag or session can be used for further communication with the readers. If the system and the tags implements tag to tag communication, the selection commands might be transmitted from tag to tag via standard or tag to tag protocols.

The system may use a mask or filter to track semantic groups or semantically connected tags. The received RFID data from the group of tags might be correlated in order to infer whether the tags are in close proximity, infer additional semantics based on location and/or received data or tune up RFID protocol parameters.

The semantics, whether simple, composite or group, can be used to define access control rules and plans. The access control plans may include rules for allowing/denying access to specific areas, raising alarms, generating events, controlling I/O, activating/deactivating hardware inputs and/or outputs or any other action that is needed for the overall consistency and access throughout the semantic field. As described above, the system iterates through the access control rules and identifies and applies all rules that are related with the potential paths and links that the RFID tag may take from a location. As the RFID progresses through those locations, paths and links, the system may infer semantics including the semantics used to determine the access in the first place. The system may use previously identified semantics to apply against access control rules and also the semantics that the object may be able to infer while passing any oriented link from the endpoint where is located; hence the object will be assigned only the allowed semantics. If the object tries to infer semantics that are not allowed, the system might impede physical access, raise alarms, generate events, infer semantics and any other action that might be applicable by the use case.

The access control rules may use semantic intervals that are in fact time interval specified based on semantics. For example instead of defining a time interval in terms of a date and/or time, the system may accept also a time interval based on when one or more specific semantics occurs/expires. Also, the access control rules might be specified in terms of how many times a semantic has been inferred and/or at what times.

Access control rules may be specified based on, or associated with sensing data for advanced operational control. For example if a sensor in a refrigeration area detects that the temperature is below freezing the system might impede access to the freezing area to a perishable item, and, eventually open access for the item in another normal functioning refrigeration area.

Access control rules may further be specified as a function of group or composite semantics applied to a tag. For example, a tag may be authorized to enter a given area when assigned to a group, and only when moving with the group, but not authorized if moving alone. Alternatively, a tag may be authorized only based on a particular composite semantic of two or more semantics.

The system can define time management rules and plans in order to manage, track and record the time of the objects in the field and also allow for events, alerts and semantics based on time rules. The time management rules and plans define how the time of the objects should be interpreted and recorded in the field; they may also enable generation of events, alerts and semantics based on the plans' rules.

The plans can be defined on daily basis, weekly or any other interval of time; there can be also plans for special days, special intervals, holidays or any other time interval as required. Usually the daily based plans include fine grained time rules used for daily bases usage, while other time plans can make use of the daily based plans to assign and define daily time plans for each day in the considered interval. The time plans can be composite which means they can be mixed together for increasing the interval coverage and ease of use. The time plans may also be used as templates for any time management needs.

Time management rules and plans may use semantics within their definitions and rules and further, may enable and define rules used by the system for semantic inference.

As in the case of access control rules and plans, the time management rules and plans can be coupled with semantics in order to define more complex or effective time rules and patterns. For example an asset daily time plan might define an interval designed for disinfection; if the system detects that the asset haven't been using the DISINFECTION link while in the designed time interval it may generate an alert, prompt user for an input or any other action as appropriate. Further, the system may not infer the DISINFECTION semantic if the DISINFECTION link has been used outside of the allowable interval; additionally the DISINFECTION semantic may not be inferred if a sensing entity in the disinfection area recorded a disinfectant concentration below the required disinfection threshold interval. If the system detected that the disinfection occurred as planned it may record any required information including the time the item was in disinfection, infer semantics and not generate any out of ordinary events or actions. Similarly, the system may record information, may generate events, infer semantics and require actions for not according to the plan events.

The time management rules and plans may also be used to derive new semantic artifacts and improve the semantic chain; in our previous example, if the DISINFECTION semantic didn't occur as planned the system might infer a REQUIRE DISINFECTION semantic for the locations and links through which the asset passed or is passing or for the close by assets. Thus, in this case the system may assign a semantic to a tag based on the determination that a tag did not traverse a particular link (or links) within a given time or in a particular manner. The system may also use access control rules to impede the access to endpoints until the asset hasn't been disinfected. Additionally, the tag of the person handling the equipment might be assigned semantics to reflect the fact that might not be compatible to handling the equipment and generates possible hazardous consequences. Further, the system might use the event to create a group of persons qualified or not qualified to handle the equipment, assets requiring disinfection and assign members and semantics to it.

The access control rules and plans and time management rules and plans may use semantic intervals that are in fact time intervals specified based on semantics. For example instead of defining a time interval in terms of a date and/or time, the system may accept also a time interval based on when specific semantics occurs/expires. Also, the access control rules and plans and time management rules and plans might be specified in terms of how many times a semantic has been inferred and/or what times.

Time management rules and plans may be specified based on, or associated with sensing data for advanced operational control and accountability. For example if an air quality sensor in a warehouse detects that the air quality is low the system may adjust the recorded working time for the employees working in the warehouse and/or provide alerts to the shift manager. In one example, the system may thereby assign a semantic based on one or more combinations of the air quality, location, and time attributes of the employee.

Access control rules and plans and time management rules and plans may use semantic groups or semantic group templates for rules definition. For example a semantic group might be assigned specific rules for increased system accuracy. If a semantic group template is used, the rules may apply for all semantic groups that comply with the template. Additionally, the system may generate new semantic groups and rules based on the template.

Further access control rules and plans and time management rules and plans may use templates for rules and/or plan definition. These templates may be used to be matched against semantics and semantic groups; additionally they can be used to generate new rules and/or semantic artifacts.

The time management rules and plans might use semantic intervals that are in fact time interval specified based on semantics. For example instead of defining a time interval in terms of a date and/or time, the system may accept also a time interval based on when a specific semantics is determined or expires. In one case, an interval can start when a semantic of "IN WAREHOUSE" is determined/expired and possibly spans for a time interval or, alternatively, until when another semantic is determined/expired. This allows for fine grained control of time recordings and time management because the time is recorded every time in a recording/working area and eventually not recorded when out of a recording/working area. The semantics used to define semantic intervals may have full capabilities including composition, grouping, expiration and any other semantic features.

The system records and keeps track of the time a tag consumed on different activities based on semantics. In one example if a tag is assigned a "MAINTENANCE" semantic, maybe because it passed a "MAINTENANCE" oriented link to the maintenance area, then the system may record the time (or duration) that the tag was in maintenance activity based on the determined semantics and assign the time to particular activities.

Also the time management rules and plans might include hours that should be calculated with indexing and correction factors; this correction and indexing factors might be also based on determined or soon to be determined semantics. For example if an employee tag has been assigned a semantic of HAZARDOUS condition then the system might use specific indexing and correction factors (e.g. multiply the time worked under hazardous conditions with a factor of 2).

A rating and/or weight can be assigned to a semantic or a semantic group. Additionally, a rating can be derived for the tags or group of tags in the semantic field; the derived rating might be of a general nature, rating the artifact overall or, it can be of a more particular nature rating a particular aspect of the artifact via a semantic. Semantic ratings can be used to calculate an overall rating. For example if a tag is assigned several MAINTENANCE semantics during non-maintenance windows the tag rating might be decreased because the tagged device may not be very reliable. The system may assign ratings and/or weights to semantics and semantic groups and apply those to rate the tags once semantics and semantic groups are inferred or at any other time. As an example, a rating of a car may increase if it has been assigned a semantic of WASHED. For a perishable item that has been stored for an interval of time in a non-refrigerated area its rating might also decrease and possibly be used to decrease the expiration date. Also, a tag rating may change based on the ratings of other tags or groups found in its vicinity. Additionally, the ratings and/or weights might be further processed, adjusted and assigned to a semantic or a semantic group.

Further, the ratings and/or weights can be used to define or augment access control rules and time management rules. As an example, the access control rules and time management rules might use time intervals or semantic intervals to specify rules based on ratings or define rating and/or weighting rules. Additionally, rating plans may be defined and they may use rating and/or weighting rules based on time intervals, semantic intervals and/or rating intervals.

The semantic model may be associated with rating rules and rating plans. The rating rules may change based on internal or external semantics and/or semantic groups.

Additionally, the locations and the oriented links can be associated with rating rules and plans and the semantic model.

The semantic model may change based on ratings. For example, if a paint spray pump is assigned a high rating on POLLUTION and it has been used in a warehouse, then the system might assign to the warehouse location or the links to the warehouse a semantic of HAZARDOUS, possibly with a rating of 2 stars or a weight of 0.5, while the spray pump was present and possibly an additional interval thereafter. Additionally, the ratings of the tags/items or tag/item semantic groups inside the warehouse may be decreased based on the POLLUTION and HAZARDOUS semantics and their assigned ratings and/or weights. The system may also adjust the ratings and/or weights based on other semantics or intervals (e.g. the HAZARDOUS semantic weight is decreased with the time passed since the paint pump has been left the warehouse; or, possibly, until another semantic of DEPOLLUTION occurs; or can be correlated with a sensing device that measures the quality of air). Yet other new semantics may be inferred for tags or semantic groups once a rating reaches a threshold value or interval. A rating can be acquired from external sources. It can be provided, for example, by a user from a mobile device. Once the rating is acquired the system may adjust the internal ratings and weights based on the acquired rating.

The tag or group of tags ratings can be used to determine rewards and incentives. The system may determine rewards and incentives in a similar way that it determines the ratings for a tag or group of tags. The semantic model may be associated with reward rules and plans. The rewards rules may change based on internal or external semantics and/or semantic groups. Additionally, the locations and the oriented links can be associated with reward rules and plans.

An aspect of using the system to calculate rewards and incentives is that the system may use a fixed or dynamic amount or quantity of rewards and incentives. As such, the system may recalculate and redistribute the rewards and incentives based on ratings, semantics, semantic groups, semantic model and network model. Further, the semantic model may change based on the amount and quantity of rewards and incentives.

In some examples, the system uses sensing data for inferring semantics. Sensing measurements from sensing entities are used to infer and derive semantics in the semantic field. The semantics can be derived from any type of sensing event, recording or data and may include rules and determinations based on time intervals, semantic intervals, thresholds etc.

Once a semantic is inferred the system may use it to trigger commands to the sensing and control entities. The system may setup time intervals or semantic intervals when these entities perform specific operations. Sensing and control entities may include I/O devices, locks, switches or any other analog or digital device.

RFID enabled sensors may be configured by the system with semantic inference rules stored in the tag's memory. The tag may use these rules to infer semantics when the sensing data is read or a measurement is performed. The system may also store semantics in the RFID sensor memory when it reads the sensing data or at any other time.

The user inputs can be used by the semantic engine to learn how to further infer other semantics. As explained above, the system might infer link semantics or other complex semantics based on user input.

Sometimes the system might require manual inputs from a user. This may happen in some instances when the system detects unusual events or any other time when the system require additional information for semantic inference. As an example, during unloading a vegetable truck in the receiving area, the system might monitor the unloading of vegetable cases and detect that tagged cases are unloaded at a particular location. The system might not know a priori what kind of products are in those cases and it may require an input from the user on the type of product being stacked at that location. Once the input is received, the system may infer that the products in that location, or following the link from the truck unload door to that location, are products of the type input by the user (for example, tomatoes).

Further, the system might infer a group dependent semantic for the tomatoes cases as being part of the same shipment and even further, link those with the truck driver or the employees performing the unloading. Thus, for example, a group semantic is created as a function of the location of the goods and/or employees (at the dock), presence at a common point in time, and optionally an oriented link to arrive at the location. Also, other products can be semantically identified based on the location where they are unloaded or if they follow a particular oriented link. The locations can be close by, on the same path or different paths or any other location that might be seen suitable for the operation that takes place. Further, the system might create a semantic inference rule that links the tomatoes with the current unloading location, with the employee performing or coordinating the unloading, truck driver or any other entity involved in the process; by doing so, next time in similar conditions, when the semantic inference rules are checked the system will simply assume that the products stacked at that location are tomatoes; further, the system might use these semantic chain inputs to infer similar semantics for other locations, for other products or players in the semantic field that might be, or not, part of the same semantic groups.

As explained above, semantic inference learning was possible after additional information has been provided based on the user input. The additional information can be provided or extracted from other internal or external sources. For example, instead of requiring a user input the system might use a weighting sensor and/or maybe a color and shape recognition camera to identify the product stacked at a location as being of a certain type. Further, it may identify the speed of unloading and loading for the specific dock door and truck type and categorize that as possibly another semantic, group semantic and/or semantic group and feed it back to the semantic chain. As another automated inference example, one or more of the tags in the group may include identification information (for example, identifying the object as a tomato or something else), such that the system infers that the other items in the group are of the same type and therefore assigns them all to the group of that identification type.

The learning process and patterns may evolve as more information is fed into the system.

Similarly with the learning process for tagged items the system may create a learning process and/or patterns based on information received from sensing entities. As such, the system might infer semantic artifacts, improve the semantic chain, improve and develop the learning process and patterns based on sensing measurements, possibly, coupled with other internal and external sources.

As explained throughout the application the system uses a learning process to improve the semantic chain and deduct new inference techniques and parameters. The system may use in the learning process semantics and learning patterns from multiple sources whether internal or external.

Localization, path of travel and semantic techniques can also be used to detect illegitimate or counterfeited tags and tag spoofing. A counterfeited tag tries to copy or imitate a legitimate tag in order to legitimize the artifacts that it is attached to. A counterfeited tag may be an exact hardware copy or may be encoded with the same data as the legitimate tag; additionally, it may communicate with the RFID interrogators, readers, or detection and localization units in the same way as the legitimate tag. Similarly, tag spoofing uses hardware and communication artifacts to masquerade as a legitimate tag.

An illegitimate tag definition preferably has a broader meaning in the sense that the legitimacy is based on more general terms than being a fake tag or not. Accordingly, the legitimacy of a tag may be based on location and semantics. For example a refrigerated item that has been deemed expired because the measured temperature in its travel path has been too high may be considered illegitimate in certain paths or locations of the cold supply chain.

While it is hard to detect a counterfeited tag or tag spoofing by a simple detection or interrogation it is much easier to detect a problem if the tag path of the travel is known or inferred a-priori and if the RFID network and/or the tag are encoded with path or semantic routes for the tag. For example, the path of travel for a tag can be pre-established and be sent to the RFID network through any means of communication to the concentrators, controllers, localization units and RFID readers. The path of travel might include locations, links, and checkpoints and may be associated with timestamps or time intervals.

A semantic route specifies a collection of semantics and potential validity or synchronization times or time intervals. In one example, the system uses semantic routes to validate the legitimacy of a tag. A semantic route might be stored on the RFID networked system or on the tag itself. A tag or a semantic group may have an associated semantic route and the system compares the semantics in the semantic route with the acquired collection of semantics for the tag; if there are inconsistencies with the acquired collection of semantics for a tag and an associated semantic route then the system infers that the tag is counterfeited or spoofed.

In a semantic group proof, the tag is part of a semantic group and the system checks the legitimacy of the tag based on additional evaluation of the semantic group and members of the group. For example, if two tags from the same semantic group are detected in separate locations within an interval of time when they are expected to travel together in the semantic field as a group then the system infers that there is a potential legitimacy problem with one of the tags. The semantic group proof might extend to the whole semantic structure including all the semantic relationships.

As described in a previous section above there are areas within the monitored environment where items sharing a specific semantic are stored, located or routed. In these semantic zones the items that do not have the shared semantic can be considered as illegitimate or can trigger system events while detected in the zone. If environmental sensors are attached to the tags or are present in the environment, then the sensor reported value can be used with sematic group or semantic zones proofing.

In some examples the system uses historical data to determine the legitimacy of a tag travelling to a certain path on the semantic field. If the historical data pattern does not match the current path of travel then in one version the system determines that the tag is likely to be counterfeited or a spoofing attempt occurred.

While a tag's path of travel or semantic route checking helps to detect a counterfeited or spoofed tag that is in an out of range location, it does not solve the problem of detecting a counterfeited tag that is in the expected travel path or expected semantic route. Thus, some versions employ an additional layer of detecting the counterfeited tags, such as incorporation of challenge-response codes for the tag in question and then verifying the challenge-response codes at certain locations or access points. The codes can be generated based on location, path of travel, semantics or any other method, whether manual or automatic.

For example a tag's memory might be uploaded with challenge response pairs that exist or are sent into the RFID network via any means of communications. When the tag arrives at a location in the path of travel a reader or a set of readers detects the tag at the location and issues the challenge for which the tag sends back the paired response that was recorded in memory. The system is thereby able to verify that is a legitimate tag by confirming the accuracy of the paired response.

The tag can also be coded with semantic routes or path codes. The semantic routes or path codes can be pre-recorded or created and updated when the tag passes locations, links and checkpoints. The system can optionally generate these challenge codes to be stored on the tag based on the path of travel, locations, type of tag, semantic artifacts and groups or any other methods whether manual or automatic.

For example, as a tag passes through the path of travel its memory may be updated with information about location, link, inferred semantics or semantic groups. In order to verify the authenticity the system issues at least one challenge that is based on a location, link or semantic supposedly acquired by the tag including those related with semantic groups. If the tag returns a valid code or result then the system can identify the tag as authentic.

Additionally, while a tag is at a particular location the system might update and encode a tag with environmental conditions or sensor measurements. At a later time the system can optionally query the tag such that the response of the tag to a challenge would include those conditions. For example, if a tag passes through a location or link which is associated with a humidity of 33%, the system can encode that value into the tag's memory. Upon a later challenge of the tag by the system, the tag would return the response of 33% in order to confirm authenticity. If the tag contains a humidity sensor then the humidity value may be recorded by the tag itself when requested by the system or at any other time.

It might even happen that the legitimate tag and a counterfeited tag are detected and localized at the same time; however, in this case it is easy to deduce that one of the tags is illegitimate.

In certain conditions a tag can be disabled or enabled based on an inferred semantic or other condition such as the tag passing a certain link or path. For example once a retail customer purchases a tagged item and the tag for the item is detected as following the exit path the tag may be disabled or killed by the RF readers detecting the tag. Further, if the customer returns the item to the store the tag may be enabled again when following the return path.

In the same way RF readers or interrogators may change the tag operational state based on an assigned semantic. A tag's operational state changes can include disablement, enablement, tag killing or any other technique that would alter the visibility of the tag in the RF and semantic field. The tag operational status change can optionally require a password that was previously encoded in the tag for read/write protection.

The activation status of a tag specifies whether the tag is active or inactive in the semantic system. This status is assigned to the tag in the semantic system and it might be or not related to the tag's operational status. In some versions, particular locations may be assigned for changing the activation status or operational status of groups of tags, such as by automatically changing the status when the tag is present at the location.

Additionally, a group of tags in a particular location may be assigned a group semantic based on their activation status or operational status in the semantic field. For example tagged items that need to be disabled can be stacked in a particular location and be disabled based on location. The disablement can occur automatically, at certain times, at semantic intervals or when an operator issues a specific command at that location.

In another example a new batch of tagged items of the same type can be stacked at a particular location and be made active as part of the same semantic group.

Further, the system might use a reference tag for changing the activation status of a group or inferring a group semantic. In this case the reference tag activation status and its assigned semantics may be used for further group semantic inference, by determining the status of a particular tag, using it as a reference tag, and inferring its status to the rest of the tags in the group.

In another example for a fast tagging application, a group of tagged objects such as a collection of a plurality of magazines all having a common date are stacked at a single location. The information about the stacked items can be entered manually into the system or can be inferred based on the information known about at least one magazine in the stack.

The semantic inference and activation status changes can occur automatically, at certain times or semantic intervals, can be triggered by sensing events or when an operator issues a specific command.

If the system detects a counterfeited tag or a tag spoofing attempt it can block the access of the tag to a location, send an alarm, mark other tag as illegitimate, counterfeited or spoofed, create new semantic groups and semantic artifacts and/or infer new semantics.

Semantic routes and semantic profiles can be established based on historical data. A rating provided a-priori for a tagged item can be used to determine at a later time the optimal location and/or path for the same item or an item of the same class. For example if a product has been rated high by a consumer then the paths followed by the affixed tags within the supply chain are identified, including the measured environmental factors in certain paths' locations and used for further routes that matches the environmental factors, paths or semantic routes within the supply chain. Additionally, while the same or a similar product moves through the path, the system can receive input from environmental sensors and issue commands to adjust the environment to the optimal conditions for the travelling item. For example, if a temperature or humidity level is too low, the computer system monitoring the tagged item and in communication with a thermostat or similar controller can issue an instruction causing the temperature or humidity level to raise, for example by turning on an air conditioning unit.

When in a particular location of the supply chain the system might suggest a specific location, path or storage for a product based on the historical environmental sensor data and a provided rating.

A semantic trail which includes a sequence of semantics acquired by a tag in the semantic field might be recorded and used later to determine a semantic route for items of the same class, semantic group and category. A rating can also be used to determine the best semantic route to follow. More generally, semantic routing includes the routing and storage of tagged artifacts based on previous and current semantic observations.

In another example when a user experience is assigned a rating, the tag of the user is recorded together with its environmental, location and semantic factors. Later, the recorded data is used to process the most likely location or path of comfort for the user. As such, semantic profiles are created for tagged artifacts that can be associated to a single tag or a tagged semantic group.

The system may infer semantic routes and profiles based on the semantic chain observations. Further, using statistical and learning techniques the system may determine semantic routes and profiles based on any previously acquired data.

The system time management capabilities include the recording and tracking of the time a tag consumed on different activities based on semantics. The semantic might be represented as a string, and can include special characters or strings which are interpreted in a specific way. For example a semantic IN@LOADING assigned to a tag means that the tagged article is in a LOADING mode while the semantic OUT@LOADING specify that the article is out of LOADING mode. The interval of time between an in and out semantic event is recorded for the particular semantic, in this case LOADING. Further the system can post or transmit semantic events on social networking media sites. For example a semantic of # GREEN_AUTOS_ON_ROUTE_66 might be posted to a social thread every time an automobile passes a link on route 66 and its pollution parameters are below a certain level. The posting can also include additional identification information, and can be rated and used to recalculate the semantic ratings and weights.

The RFID tags as described above may take any form, but they commonly include at least one transmitting and/or receiving logic and antenna. The tags may include an energy harvesting component, an energy source and/or storage components. As some examples, the energy source might include a super-capacitor, a battery, a solar cell or any other energy harvesting and/or storage component. In energy harvesting mode the tags collect and eventually store environmental energy that can be used later for communication purposes. In some instances the energy can be used by an internal sensing component. The energy harvesting component can be also fed at times by a RF transmitter which may be part of an RFID reader, tag or any other charging wireless unit.

The harvesting of the energy can be done using the communication antenna or a separate antenna used for this particular purpose. The antennas can use metamaterials for miniaturization, optimal energy transfer and communication. A metamaterial antenna might reduce loses from the energy source due to its capabilities of focusing and guiding the receiving electromagnetic energy.

During a localization or semantic cycle the tags that receive RF signals generated by readers can use the RF signal energy to recharge the storage unit. When in a communication cycle the tags may be instructed to respond/adjust using certain transmit power level, antenna polarization, gain, radiation pattern and orientation. If the tag antenna includes patterns of radiating elements then the tag may be instructed to activate only specific radiating elements for communication and localization optimization and/or tune specific radiating elements with specific parameters. This may save energy and reduce unnecessary interference.

When in energy harvesting mode the tags can orient and tune the parameters of their energy harvesting antenna dynamically to the energy source, based on parameters measured at the antenna elements. The measured parameters can include angle of arrival, phase, signal strength, signal polarization and others. The same dynamic antenna orientation approach might work for any transmit or receive cycle. In some versions, a tag can tune and setup its transmit and receive parameters based on received or determined semantics. The localization and semantic techniques can likewise be used in various environments and setups using various RF protocol stacks, communication, positioning, localization and identification.

RFID readers can be replaced by RFID tags in broadcast or beacon mode that actively broadcast or advertise information, including their own identifiers, on demand or at intervals of time. The RFID beacon tags may be comprised from at least one RF transmitter and antenna which may have the capability of changing its operational parameters including RF transmit power, antenna gain, antenna radiation pattern, antenna orientation, antenna polarization and RF transmit frequency. In general, the use of the term "RFID tag" includes RFID beacon tags or RFID tags operable in a beacon mode. Similarly, in general the term RFID tag reader includes receivers configured to receive communications from RFID beacon tags.

The RFID beacon tags may be setup to transmit in the field of view using various settings at different times. The receivers of the RF beacon signals can use the received signal and/or convey parameters and measured attributes of the received signal to a localization computing entity that uses localization techniques and algorithms to estimate the receiver position. Similarly, an RFID master tag may also include beacon capabilities in addition to its other capabilities.

An RFID beacon tag may transmit with advertisements besides its own identifier, the settings, or an identifier of the settings. As such, the signal from the RFID beacon tags can carry data that includes the tag or beacon identifier, the transmit settings and any other information that may be used for profiling and/or localization.

A localization sequence can entail having a tag receiving a beacon signal that encodes the beacon identifier together with the beacon settings parameters. The tag conveys that information together with its own identifier and received signal attributes to the localization unit for further processing. The localization unit may aggregate the data from the tags and determine the location and/or semantics. Tag to tag communication including signal and semantic beaconing can optionally occur for improved localization and semantic inference.

When a tag is switched to semantic identification mode it starts broadcasting a signal with acquired or inferred semantic information that can be used by other tags to derive additional semantics based on the stored semantic rules or to identify themselves as part of a semantic group.

The tags can optionally encode in the internal memory semantic rules that can be used to derive additional semantics based on the data received from the beacon tags. The semantics can be stored internally and used for further processing, can be transmitted to other tags or to a localization or semantic unit.

While the preferred embodiment of the invention has been illustrated and described, as noted above, many changes can be made without departing from the spirit and scope of the invention. For example, functions performed by the computer 36 may be performed in a distributed manner in other embodiments, making use of various combinations of computers embedded within the concentrators and the RFID readers themselves. Further, the above description relates to a variety of hardware and software functions and components to accomplish those functions. In many cases, components that are described as hardware in a preferred embodiment may be replaced by software capable of performing the function of the hardware, and vice versa. Accordingly, the scope of the invention is not limited by the disclosure of the preferred embodiment. Instead, the invention should be determined entirely by reference to the claims that follow.

The invention claimed is:

1. A radio frequency identification (RFID) system for localizing an RFID tag, the system comprising:
   a plurality of radio frequency identification (RFID) tag readers;
   a computer system communicatively coupled with the plurality of RFID tag readers;
   a memory associated with the computer system, the memory storing a network model having a plurality of endpoints and oriented links between the endpoints, wherein the endpoints are associated with physical locations in space;
   the memory further containing a plurality of time management rules, at least one of the plurality of time management rules associating a predefined time interval and a presence of the RFID tag at one or more of the location based endpoints with at least one semantic attribute from among a plurality of semantic attributes stored in the memory,
   the computer system being configured to localize the RFID tag based on data received from the RFID tag readers;
   the computer system further being configured to infer the semantic attribute for the RFID tag by:
   mapping one of the oriented links to a source endpoint at a first physical location and a destination endpoint at a second physical location;
   determining that the RFID tag is present at the source endpoint at a first time value;
   identifying a particular one of the time management rules applicable to the traversal of the oriented link by the RFID tag based on the predefined time interval in comparison with the first time value; and
   inferring the semantic attribute for the RFID tag based on the oriented link and the particular one of the time management rules.

2. The system of claim 1, wherein the RFID tag is a master tag.

3. The system of claim 1, wherein the RFID tag is a beacon tag.

4. The system of claim 3, wherein the system adjusts the setting of at least one of the plurality of RFID beacon tags based on a time interval and a configured security level.

5. The system of claim 3, wherein the computer system sends a semantic identifier associated with the inferred semantic to at least one RFID beacon tag, and further wherein the RFID beacon tag broadcasts the semantic identifier.

6. The system of claim 5, wherein the semantic identifier is the inferred semantic attribute.

7. The system of claim 1, further comprising a sensing entity attached to the RFID tag, the semantic attribute being a function of a parameter detected by the sensing entity.

8. The system of claim 1, wherein the computer system invalidates the semantic attribute after the passage of a predetermined time interval.

9. The system of claim 1, where the network model further comprises a predefined plurality of semantic attributes, and wherein the computer system is configured to infer the semantic attribute to the RFID tag by selecting the semantic attribute from among the predefined plurality of semantic attributes.

10. The system of claim 1, wherein the system changes an activation status of at least one of the RFID tags based on the inferred semantic.

11. The system of claim 1, wherein the computer system provides a notification to a user based on the inferred semantic.

12. The system of claim 1, wherein the system further includes a sensor measuring a parameter other than RFID location, and wherein the at least one time management rule includes an association between a value of a parameter detected by the sensor and the semantic attribute.

13. The system of claim 1, wherein the predefined time interval is defined as a semantic interval.

14. The system of claim 1, further comprising an IO controller, wherein the computer system issues a command to the IO controller based on the semantic attribute.

15. The system of claim 1, wherein the RFID tag belongs to a category and the RFID tag association with the time management rule is based on the category.

16. The system of claim 1, wherein the computer system is further configured to infer a second semantic attribute for a second RFID tag by:
   determining that the second RFID tag is present at the source endpoint;
   identifying a second particular one of the time management rules applicable to the traversal of the oriented link by the second RFID tag based on the predefined time interval; and
   inferring the second semantic attribute for the second RFID tag based on the oriented link and the second particular one of the time management rules;
   wherein the semantic attribute and the second semantic attribute are different from one another.

* * * * *